United States Patent [19]

Wert et al.

[11] 4,220,833
[45] Sep. 2, 1980

[54] LOCATION OF A FAULTY PULSE FORM RESTORER IN A CABLE SYSTEM

[75] Inventors: Harry E. Wert, Winter Park; Richard A. Branham, Orlando, both of Fla.

[73] Assignee: The United States of America as represented by the Secretary of the Army, Washington, D.C.

[21] Appl. No.: 832,761

[22] Filed: Sep. 12, 1977

[51] Int. Cl.³ .............................................. H04J 3/14
[52] U.S. Cl. .................... 179/175.31 R; 179/175.3 F; 370/15
[58] Field of Search .................. 175.2 C, 179/175.3 F, 175.31 R, 170 J; 325/13

[56] References Cited

U.S. PATENT DOCUMENTS 3,235,677  2/1966  Friedrich .................... 179/175.31 R
3,297,833  1/1967  Houten ....................... 179/175.31 R Primary Examiner—David L. Stewart
Attorney, Agent, or Firm—Nathan Edelberg; Jeremiah G. Murray; Bernard Franz

[57] ABSTRACT

A pulse form restorer (pulse repeater) which detects that it is not passing a pulse bit steam inserts a fixed resistor in series with the constant current cable power supply, and isolation of the faulty unit is accomplished by measurement of the voltage drop through the cable system. In a test mode the near end driver modulates the digital data at a slow alternating rate. A cable fault locator coupled to the power supply output comprises a peak detector, an A/D converter and a numerical display, which convert the change in voltage between data-on and data-off intervals to a number, which by a table look up designates the faulty restorer.

18 Claims, 12 Drawing Figures

FIG. 2
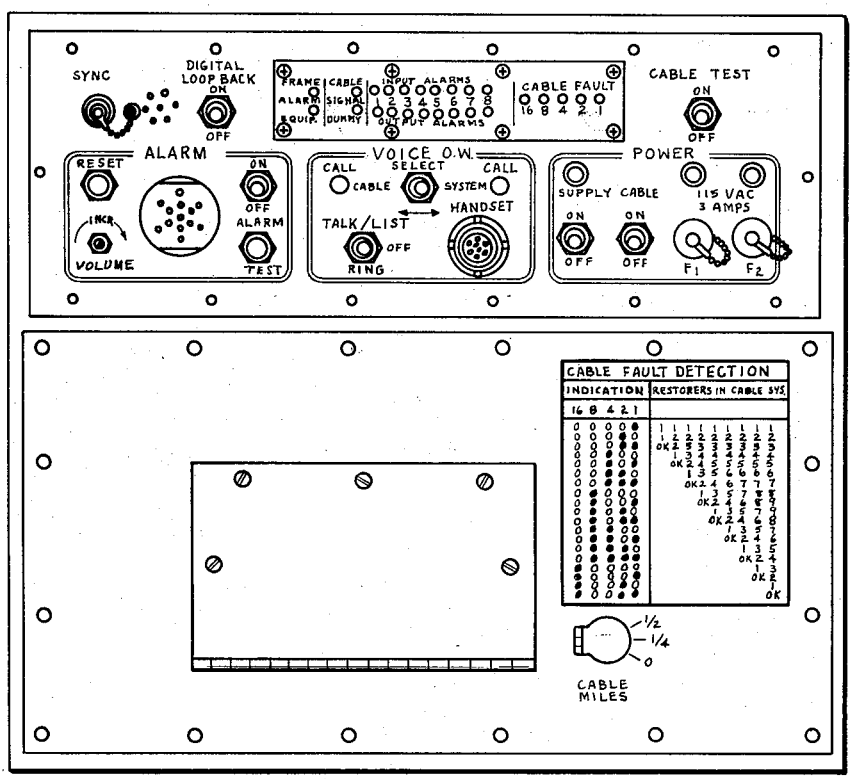
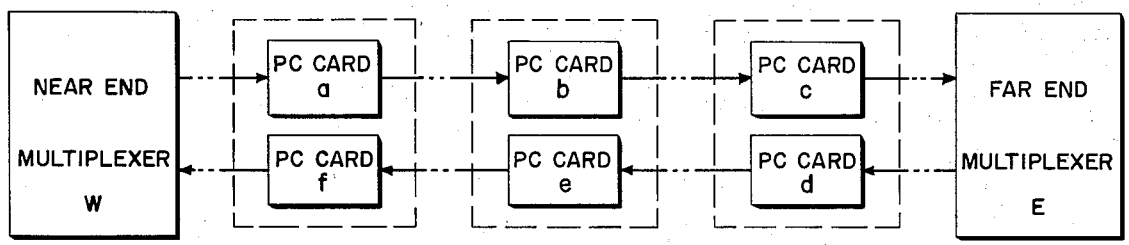
FIG. 3

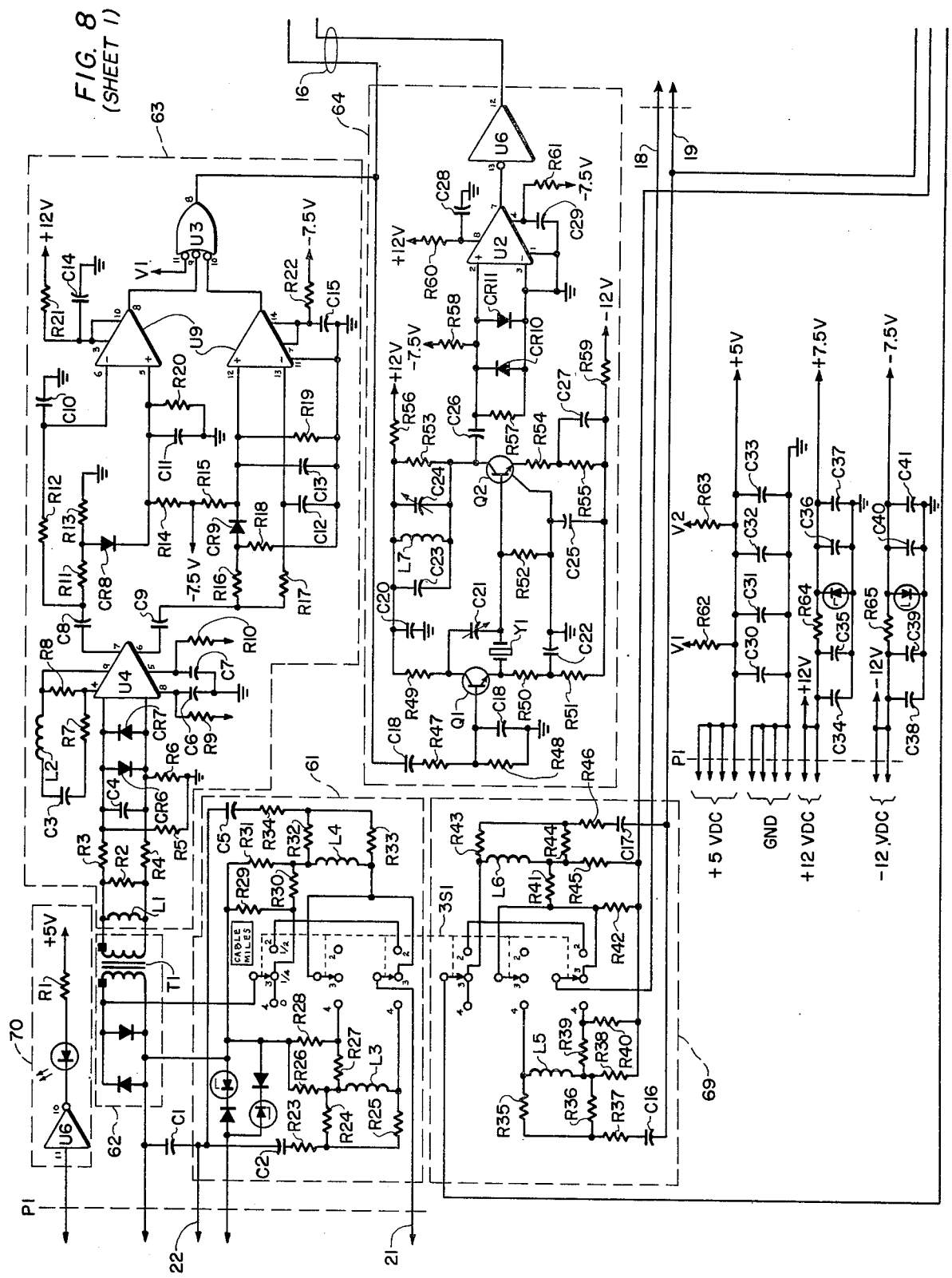
FIG. 8 (SHEET 1)

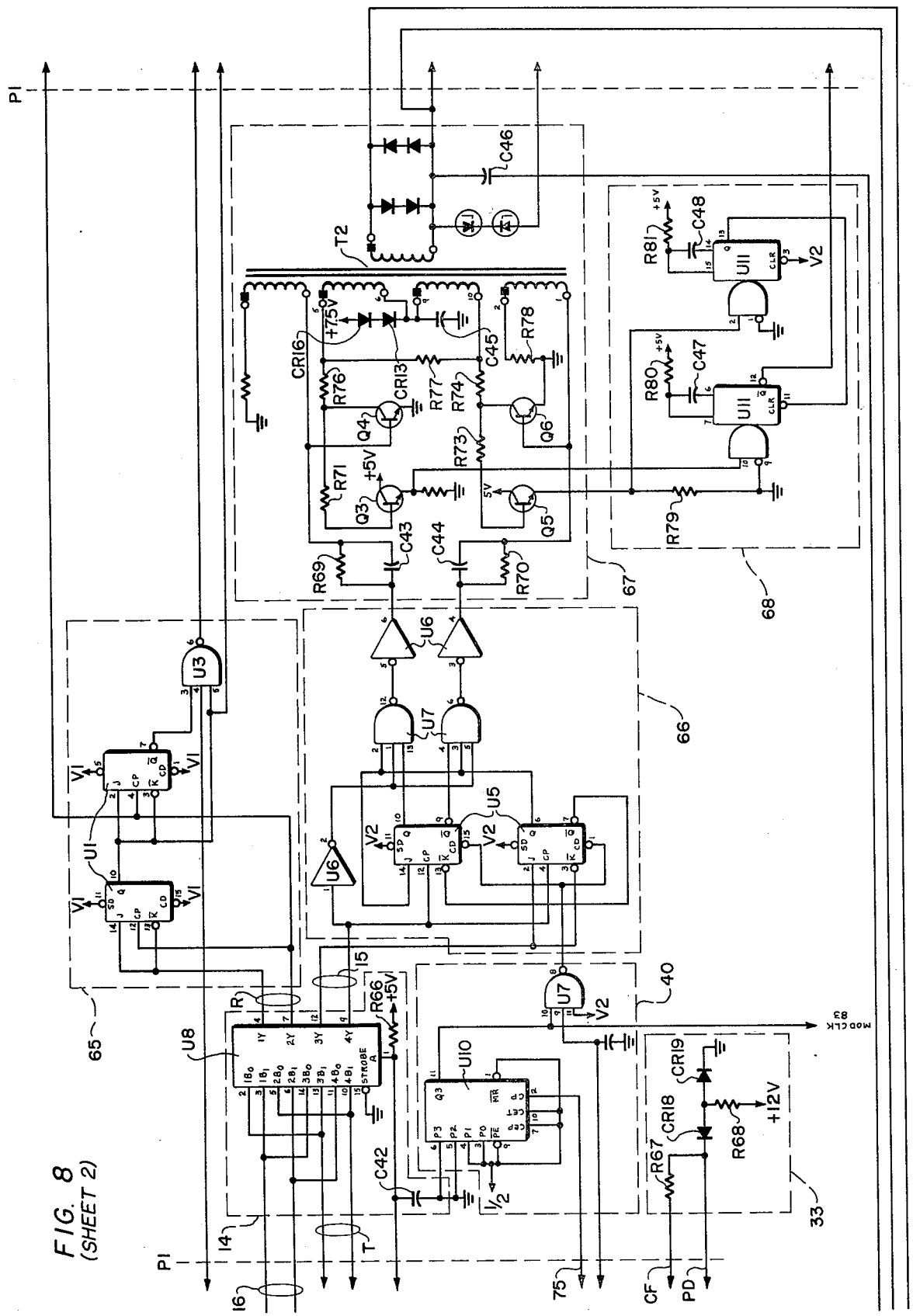
FIG. 8 (SHEET 2)

RESTORER INPUT AND OUTPUT PULSE
TRAIN RELATIONSHIP

LOCATION OF A FAULTY PULSE FORM RESTORER IN A CABLE SYSTEM

The invention described herein may be manufactured, used, and licensed by or for the Government for governmental purposes without the payment of any royalty thereon.

BACKGROUND OF THE INVENTION

This invention relates to location of a faulty pulse restorer in a pulse modulation cable system, and more particularly to a system in which a restorer which detects that it is not passing a pulse bit stream inserts a fixed resistor in series with the cable power supply, and isolation of the faulty unit is accomplished by measurement of the voltage drop through the cable system.

Existing known systems utilize a manual method for locating a faulty cable repeater, with a direct current voltage measurement technique. This approach is costly and subject to human error.

SUMMARY OF THE INVENTION

The object of the invention is to provide for effective, accurate isolation of a faulty pulse form restorer, with automatic activation of a display.

According to the invention, in a cable test mode, the near end cable driver modulates the output digital data at a slow alternating rate, turning the data bit stream on and off. This is sensed in each pulse form restorer by a traffic detector, which, in the off portion of the data, senses no traffic and switches in a fixed impedance. This fixed impedance inserted in series with cable constant current increases the cable source voltage by a known increment. The number of increments is measured at a near end peak-to-peak detector and converted to a direct current potential. Through the use of an analog-to-digital converter this potential is indicated as a numeric display of the failed restorer section.

The far end multiplexer is placed in a digital loopback mode with cable power off, so that both data and power are looped back. This allows the near end multiplexer to supply all of the cable power and enables the far end multiplexer to loop the modulated data to the return half of the cable system.

If all restorer sections switch, the voltage increase will be a maximum, indicating an operating system. Anything less is reflected as a failed restorer section. Since a failed section does not pass data it will always be in a "no data" output condition, the fixed impedance is always in series with the line. Subsequent restorer sections which are beyond a failed restorer do not receive valid data. Consequently, they insert a fixed impedance in series with the cable power. Further, only the near end restorers (those preceeding the failed restorer) will be passing valid digital data. Therefore, those restorers are the only units which will create the AC voltage measured by the multiplexer for restorer location.

The particular slow frequency for modulating the data may be 4.69 hertz, but is not limited thereto.

A further feature is that the analog to digital conversion is accomplished to eight bit accuracy at a suitable rate, for example, 6400 hertz. Although eight bits are utilized for resolution, only the five most significant bits are decoded for lamp display. The least significant bit displayed corresponds to the voltage increment due to one restorer card. The eight bit window was chosen to allow for individual restorer tolerance differentials over time and temperature. Note that DC voltage drops throughout the cable system do not enter into accuracy determination since the A/D conversion is accomplished on the AC component only.

Advantages of the invention over prior practices are that the technique is (1) fully automatic, (2) automatically accommodates for changes in cable resistance and/or DC current variations due to cable current power supply, (3) not limited to any particular equipment, and (4) may be designed for accuracy over a large temperature range.

DESCRIPTION OF THE DRAWING

FIG. 2 is a front view of one multiplexer;

FIG. 3 is a diagram for explaining location of a pulse form restorer in a system with three restorers;

FIG. 8 (two sheets) is a schematic diagram corresponding to FIG. 7;

DESCRIPTION OF THE PREFERRED EMBODIMENT

A. General (FIG. 1)

Figure 1:
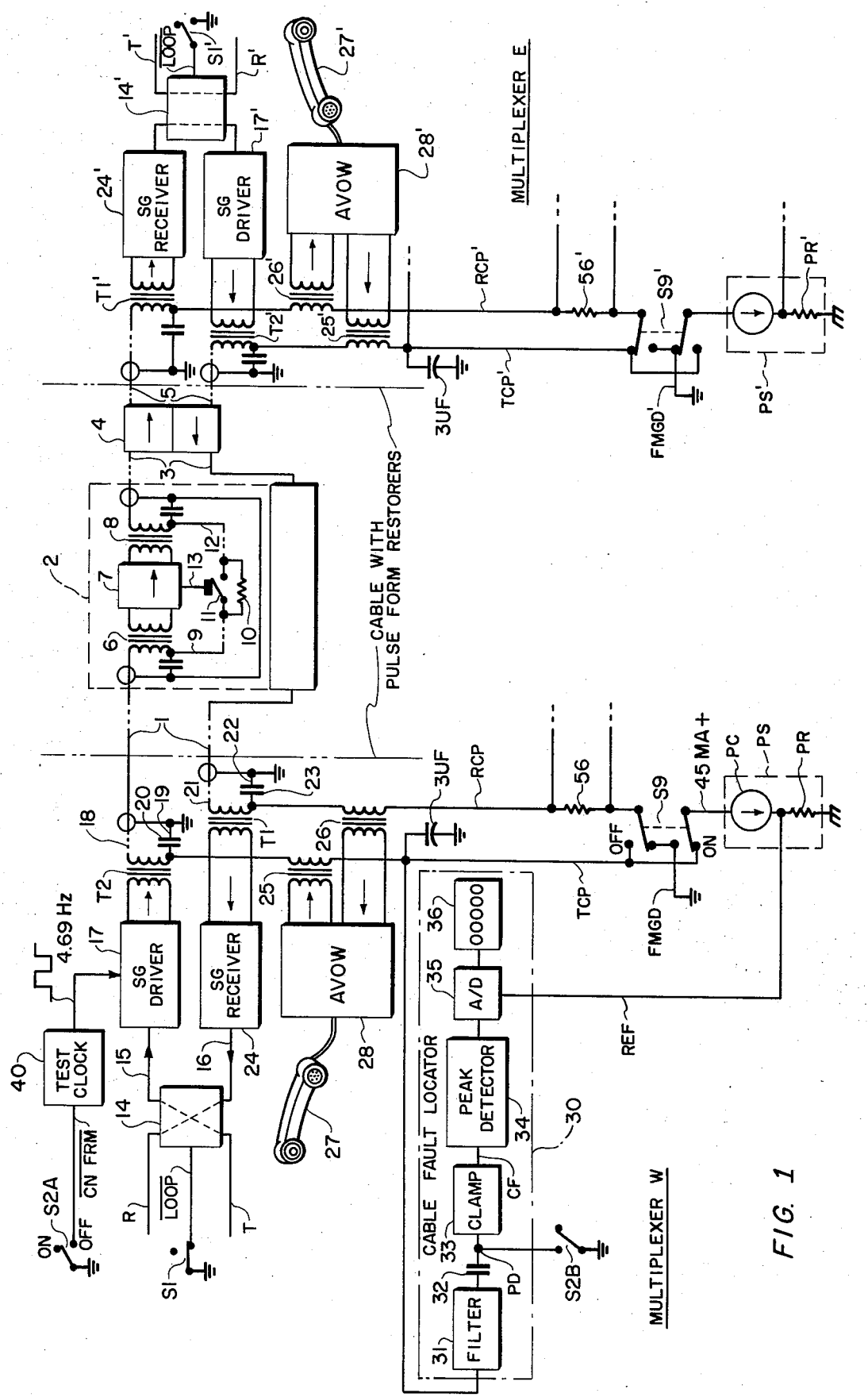
FIG. 1 is a symbolic circuit diagram showing cable fault location in a PCM multiplexer system.

A cable fault location system is shown in FIG. 1, incorporated in a pulse transmission system for sending a supergroup pulse bit stream in each direction over a cable, with a multiplexer at each end. The cable comprises a center conductor with an individual shield for each direction, and the two shielded conductors have an additional overall shield. Using a pulse form restorer for each one half mile length of cable, operational lengths of up to five miles are possible.

In FIG. 1 there are shown three lengths of cable 1, 3 and 5 interconnected by pulse form restorers 2 and 4. Each pulse form restorer has two identical havles, for the two directions of transmission respectively. Part of the apparatus of multiplexers W and E are shown connected at the ends of cable lengths 1 and 5 respectively. An end length of cable may be one half or one quarter mile, or in some cases of zero length. The pulse form restorers are powered by 45 milliamperes of DC current transmitted over the center conductors from the multiplexers.

The cable fault isolation sytem is built into the multiplexer and pulse form restorers to permit the isolation of a faulty pulse form restorer anywhere along the five miles or less of cable from the front panel of the multiplexer. Information is presented to the operator in binary form on the multiplexer front panel which isolates the fault on the cable to the first restorer that is not passing the digital bit stream. Basically a faulty restorer inserts a fixed known voltage drop in series in the direct current power path. It does this by operating an electronic switch to a high impedance state to thereby remove a shunt of a precision resistor. The cable fault locator in one of the multiplexer units detects the peak voltage, makes an analog-to-digital conversion, and displays the value in binary form. With a table look up, the operator can then identify which of the pulse form restorers is faulty.

Each pulse form restorer has two identical and independent circuits, each with its own printed circuit card, one for W to E transmission and the other for E to W. Part of the top circuit of restorer 2 is shown symbolically in FIG. 1. The digital electronic circuits 7 for the pulse bit stream are coupled between an input transformer 6 and an output transformer 8. A bypass circuit for the direct current power, and also for voice frequency signals for an analog voice order wire, extends through the primary winding of transformer 6 and conductor 9 to conductor 12 and the secondary winding of transformer 8. The details of the bypass circuit are omitted in FIG. 1, except for the precision resistor 10 shunted by an electronic switch shown symbolically at 11. The switch is biased via a control conductor 13 to be normally conducting. When the circuits 7 detect that a pulse bit stram does not exits, a fault signal on conductor 13 biases the switch to its off state to thereby insert the resistor 10 in the direct current circuit.

In the normal mode of operation in multiplexer W, the supergroup data bit stream and timing signals on two conductors of line T are coupled through a multiplex gate unit 14 and a two conductor line 15 to the supergroup driver 17. The output is supplied to the cable via a transformer T2. One end of the secondary winding is coupled via a line build out network (not shown in FIG. 1) and conductor 18 to the center conductor of one part of the cable 1. The other end of the secondary winding is coupled via a capacitor 20 to the shield of this part of the cable.

The other part of cable 1 has the center conductor connected to conductor 21 and a line build out network (not shown in FIG. 1) to the primary winding of transformer T1. The other end of the winding is coupled via a capacitor 23 to the shield. A supergroup receiver 24 with input from transformer T1 supplies supergroup data and timing signals on two conductors via line 16, multiplexer gate unit 14, and line R.

Each multiplexer includes a power supply PS which provides regulated power at various voltages required for the electronic circuits. One part PC of the power supply provides a regulated 45 milliamperes of direct current for powering the pulse form restorers of the cable. The negative terminal is connected via a precision resistor PR to ground, to provide a reference voltage to the cable fault locator. The cable switches S9 is in the ON position and S9' is in the OFF position (or vice versa). The current then flows in series from the positive terminal via S9, lead TCP windings of transformers 25 and T2, lead 18, the center conductor and the pulse form restorers in the W-E part of the cable, windings of transformers T1' and 26', lead RCP', resistor 56', switch S9', lead TCP', transformers 25' and T2', the center conductor, transformers T1 and 26, lead RCP, resistor 56, and 59 to a frame ground point. There is a similar path from the power supply PS' when 59 and 59' are switched opposite to the positions shown in FIG. 1. Further, both PS and PS' can be switched to the ON positions (59 and 59') and separate currents are available.

A number of methods are provided for orderwire communication between personnel in the multiplexer shelter and other stations in the communication system. Landlines are connected to the shelters for both telephone and teletype communication, and field telephones and an intercom set are also provided. Orderwire signals may be connected to any multiplexer for transmission on the associated supergroup bit stream as a digital signal. Further, analog orderwire signals may be applied directly to the cable conductor. The analog orderwire applies the comparatively low-frequency voice signals on the same conductor that carries the high-frequency bit stream. The voice signal is then tapped off the line at the receiving end without interfering with the bit stream. The analog orderwire can be used to communicate with cable maintenance personnel with a test set connected into any of the pulse form restorers in the cable system. The digital voice signals are transmitted in a time slot in the supergroup bit stream especially reserved for local interstation communication. Teletype data may also be multiplexed onto the supergroup bit stream.

The analog voice orderwire apparatus is represented in FIG. 1 by a handset 27 and electronic circuits 28. The voice frequency signals are coupled to the cable by transformers 25 and 26 for the sending and receiving directions respectively. There is similar equipment at each multiplexer.

Each multiplexer includes cable fault locator circuits 30, shown only in multiplexer W in FIG. 1. These circuits include a spike filter 31, a coupling capacitor 32, a clamp 33, a peak detector 34, an analog-to-digital converter 35, and a display 36. There is also a test clock 40 to apply a 4.69 hertz square wave signal to the driver 17.

The front control panel includes switches S1 for DIGITAL LOOPBACK, S2 for CABLE TEST, and S9 CABLE POWER CONTROL. In the far end multiplexer E, the digital loopback mode has lead LOOP open at switch S1', so that the multiplex gates 14' couple the supergroup receiver output to driver 17'.

FIG. 1 depicts the system operation for cable fault location between two multiplexers with the far end multiplexer operating in the power loopback mode (cable power off), and the digital loopback mode. The near end multiplexer is placed in the cable fault mode which causes supergroup data to be interrupted in a squarewave fashion at 4.69 Hz. Each pulse form restorer will sense this data interrupt, and consequently insert an additional resistance in series with the cable thereby causing a known additional voltage drop to be created across each restorer. Any defective restorers will not sense the data interruption; the additional voltage will be inserted at all times. Since the cable power supply is a constant current source, the voltage from supply PS will adjust itself according to the resistance in the total circuit; therefore, the voltage drops created by good restorers at a 4.69 Hz rate will be summed and applied to a P/P detector located on the line buildout and converter card. Hence, it should be noted that all constant dc ohmic resistances are nullified by this technique. Once this ac to dc conversion is accomplished by the P/P detector, an eight bit analog-to-digital conversion is performed, and the five most significant bits decoded for the cable fault display. A simple table lookup is then performed by an operator to ascertain which restorer in the cable system is at fault.

B. Multiplexer Case, Panels, and Controls (FIG. 2)

A front view of one multiplexer is shown in FIG. 2. It should be noted that the complete-multiplexer circuits, not all shown herein, provide for combining eight PCM groups into one supergroup for transmission over the cable, and for decombining the received supergroup from the cable into eight PCM groups. While only the front is shown herein, the following description covers other panels and controls, and the internal mechanical arrangement.

The multiplexer contains 15 plug-in circuit cards, one replaceable power supply, and a remote orderwire alarm panel. All operator controls and indicators are mounted to the front with the exception of the 60-, 400-Hz selector switch on the rear of the power supply. All interconnecting cable receptacles, except the SYNC and HANDSET receptacles, are mounted on the rear panel. There are two handles for ease of handling. Mounting flanges are attached to both sides so that the unit can be rack mounted.

1. Front Panel and Front Cover

All operator controls and indicators are located on the upper front panel. The lower front panel, which is a protective cover for the plug-in circuit cards, has a hinged access door and an access screw mounted on it. The hinged door provides access to the control switches mounted on the circuit cards. The access door covers a hole in the lower front panel that provides access to the line buildout network switch used to set the attenuation at the cable input and output connectors.

2. Rear Panel

The upper rear panel is the power supply assembly. The power supply is a plug-in assembly. There is one multipin connector on the front of the assembly that mates with a receptacle in the case when the assembly is installed. The lower rear panel mounts 26 coaxial receptacles, two multipin receptacles, a binding (ground) post, and two lightning arrester assemblies.

3. Top Cover

The top cover provides access to the remote orderwire alarm panel assembly stowage location behind the upper front panel. All controls, indicators, and receptacles needed for remote operation of the orderwires and alarm indications are mounted on the front of the remote orderwire alarm panel.

4. Plug-In Printed-Circuit Cards

The 15 plug-in PC cards are physically similar. All components are mounted on one side of the circuit card. Each circuit card is keyed at the connector end to prevent insertion of a card in the wrong receptacle of the backplane wiring board. Table A is a listing of the plug-in circuit cards for the multiplexer.

TABLE A

| | Multiplexer Plug-in PC Cards | |
|---|---|---|
| Reference Designation | Item Circuit card assemblies | Quantity Per Unit |
| A1 | Digital data orderwire encoder | 1 |
| A2 | Alarm Detector | 1 |
| A3 | PCM group frame monitor | 1 |
| A4 | Master oscillator and overhead generator | 1 |
| A5,A10 | Timing and control | 2 |
| A6 thru A9 | Dual-channel processor | 4 |
| A11 | Frame-sync detector/maintenance | 1 |
| A12 | Digital data orderwire decoder | 1 |
| A13 | Supergroup driver/receiver | 1 |
| A14 | Analog voice orderwire and cable fault | 1 |
| A15 | Digital voice orderwire | 1 |

5. Controls a. Front Panel Controls

The controls, indicators, and receptacles on the front panel are functionally described in Table B.

TABLE B

| TD-976 Front Panel Controls, Indicators, and Receptacles | |
|---|---|
| Control, Indicator, or Receptacle | Function |
| SYNC receptacle (J1) | Provides synchronizing signal to external oscilloscope. |
| FRAME ALARM indicator | Lights to indicate that the multiplexer cannot synchronize with incoming supergroup bit stream due to either loss of bit stream or too many errors in stream. |
| EQUIP. ALARM indicator | Lights to indicate hardware failure within the multiplexer. |
| CABLE SIGNAL indicator | Lights to indicate that multiplexer is not transmitting supergroup bit stream. |
| DUMMY SIGNAL indicator | Lights to indicate that dummy pattern is being received on one or more PCM groups within incoming supergroup bit stream. |
| INPUT ALARMS 1 through 8 indicators | Lights to indicate that a TD-660 sync pattern is not being received from designated PCM group in incoming group bit stream. |
| OUTPUT ALARMS 1 through 8 indicators | Lights to indicate that a TD-660 sync pattern is not being demultiplexed properly from the received supergroup data stream. |
| LOOPBACK switch (S1) | In ON position, routes incoming supergroup bit stream back to transmitting multiplexer and ties internal multiplexer bit stream to demultiplexer circuits. |
| CABLE FAULT 16, 8, 4, 2, | Light to indicate which pulse form |

TABLE B-continued
TD-976 Front Panel Controls, Indicators, and Receptacles

| Control, Indicator, or Receptacle | Function |
| --- | --- |
| and 1 indicators | restorer in supergroup cable system is defective when in cable test mode. |
| CABLE TEST Switch (S2) | Connects test circuit to cable to activate cable fault locator circuit to identify which restorer in supergroup cable is defective. |
| POWER CONTROL F1 and F2 indicators (DS4 and DS5) | Lights when associated fuse is blown. |
| POWER CONTROL F1 and F2 fuses | Fuse ac power input to multiplexer. |
| POWER CONTROL CABLE switch | Connects cable power output power supply to supergroup cable. |
| POWER CONTROL LINE indicator (DS3) | Lights when regulated dc voltage is applied to circuits. |
| POWER CONTROL LINE switch (S8) | Connects ac power to power supply. |
| VOICE O.W. SYSTEM CALL indicator (DS2) | Lights when there is an incoming call on digital voice orderwire system. |
| VOICE O.W. HANDSET receptacle (J2) | Connects handset to orderwire circuits. |
| VOICE O.W. SELECT switch (S5) | Selects orderwire circuit to be used for voice communication. In system position, connects digital circuits; in cable position, connects analog circuits. |
| VOICE O.W. TALK/LIST/OFF RING switch (S7) | In TALK/LIST position, sets circuits for two-way communication, in OFF position, disconnects handset from orderwire circuits; in RING position, sends 1600-Hz ring signal over orderwire circuit. |
| VOICE O.W. CABLE CALL indicator (DS1) | Lights when there is an incoming call on analog voice orderwire system. |
| ALARM ON/OFF switch (S4) | Connects audible alarm to alarm circuits. |
| ALARM TEST switch (S6) | Activates alarm and orderwire circuits to test lamps and check operation and volume of alarm and orderwire audible sound. |
| ALARM audible indicator (DS6) | Provides an audible signal to indicate system malfunction. |
| ORDERWIRE AUDIBLE indicator (DS7) | Provides audible signal to indicate incoming voice orderwire call. |
| ORDERWIRE VOLUME control (R1) | Adjusts volume of orderwire audible signal output. |
| ALARM RESET switch (S3) | Resets audible alarm control circuits. | b. Rear Panel Connectors

The rear panel receptacles (not shown) are functionally described in Table C.

TABLE C
Rear Panel Receptacles

| Receptacles | Function |
| --- | --- |
| PCM IN 1 through 8 receptacles (J1 through J8) | Connect incoming PCM data groups to circuits for processing and subsequent transmission as part of supergroup. |
| PCM OUT −1 through −8 receptacles (J9 through J16) | Connect outgoing PCM data groups demultiplexed from incoming supergroup to external interfacing equipment. |
| TIM OUT −1 through −8 receptacles (J17 through J24) | Connect timing signals for each PCM group to those external equipments requiring time synchronization. |
| CABLE IN receptacle (J28) | Connects incoming supergroup data to demultiplexing circuits for processing. |
| CABLE OUT receptacle (J27) | Connects outgoing supergroup data to cable. |
| GND binding post (E3) | Provides case ground terminal. |

TABLE C-continued

Rear Panel Receptacles

| Receptacles | Function |
| --- | --- |
| REMOTE PNL receptacle (J25) | Connects remote orderwire alarm panel, providing digital signals needed for panel operation. |
| POWER IN receptacle (J26) | Connects 115-volt ac power needed for operation. |
| E1 and E2 holders | Hold lightning arrester devices that provide lightning surge protection | c. Internal controls

The controls accessible at the hinged panel in the lower front panel at Cable Miles switch access door are functionally described in Table D.

TABLE D

Internal Controls

| Control | Function |
| --- | --- |
| DATA RATE switch | Selects number of transmission channels. In HI position, selects 96 channels; in LO position, selects 48 channels. The output pulse characteristics are unaffected. Selection made for both multiplexer and demultiplexer controls. |
| GROUP CONTROL 1 through 8 switches | Switch is set to ON when the PCM group comprises 6 or 12 channels of data, and to OFF when there is no data being supplied to group processor. |
| CABLE miles | Set to provide supergroup input and output attenuation simulating various cable lengths. In ½ position, no attenuation; in ¼ position, attenuation simulates ¼ mile length of cable; in 0 position, attenuation simulates ½ mile length of cable. |

C. Cable Fault Isolation

The lower front panel (FIG. 2) includes a chart for identification of a faulty restorer. In order for the chart to be correct, it is mandatory that the far end multiplexer E is operated in the digital loopback mode and that its cable power switch be in the OFF position.

The cable power supply of the multiplexer performing the cable fault test has its output applied as an input to a peak-to-peak detector. This converts the 4.69 Hz ac component present on the supergroup cable to a dc voltage. The magnitude of this voltage is a function of both the number of restorers in the cable system, and proper operation of the restorers. An analog-to-digital conversion is then accomplished to eight bit accuracy at a 6.4 kHz sample rate. Although eight bits are utilized for resolution, only the five most significant bits are decoded for lamp display. Hence, an 8 count window is reserved for resolution of the voltage created by one restorer card (since a restorer is a duplex device, two cards are located in each restorer). This window was chosen to allow for individual restorer tolerance differentials over time and temperature. The least significant bit of the five displayed bits corresponds to the effect of one restorer card. Note that dc voltage drops throughout the cable system do not enter into accuracy determination since the A/D conversion is accomplished on the ac component only.

Interpretation of the cable fault detection chart is not complicated. The operator needs to know only the following:

1. The number of restorers in the system
2. That the number of restorers in the system are sequential, with the first physically located nearest the multiplexer performing the test
3. Which indicator lamps are illuminated If the supergroup cable is open, shorted, or no restorers are utilized, indicator 1 will be illuminated. This was implemented in order to provide some assurance to the operator that the cable fault location circuits were operating correctly.

For example, consider a three restorer configuration such as depicted by FIG. 3, for four different failures (not simultaneous failures).

First case: Supergroup cable open or shorted. For this failure, no ac component will be generated by circuit cards a through f therefore indicator number 1 will be illuminated.

Second case: Assume circuit card b has failed. This failure will cause an ac component to be generated by circuit card a only; therefore, the indication will be 1+1, or indicator number 2 will illuminated. Comparing this indication on the chart against the number of restorers in the cable system (3) provides the number −2. Consequently, restorer 2 is faulty.

Third case: Assume circuit card d has failed. This failure will cause an ac component to be generated by circuit cards a through c; therefore, the indication will be 1+3, or indicator number 4 will be illuminated. Comparing this indication on the chart against the number of restorers in the cable system (3) provides the number −3. Consequently, restorer 3 is faulty.

Fourth case: Assume circuit card f has failed. This failure will cause an ac component to be generated by circuit cards a through e; therefore, the indication will be 1+5, or indicators number 4 and 2 will be illuminated. Comparing this indication on the chart against the number of restorers in the cable system (3) provides the number 1. Consequently, restorer 1 is faulty.

Figure 4:
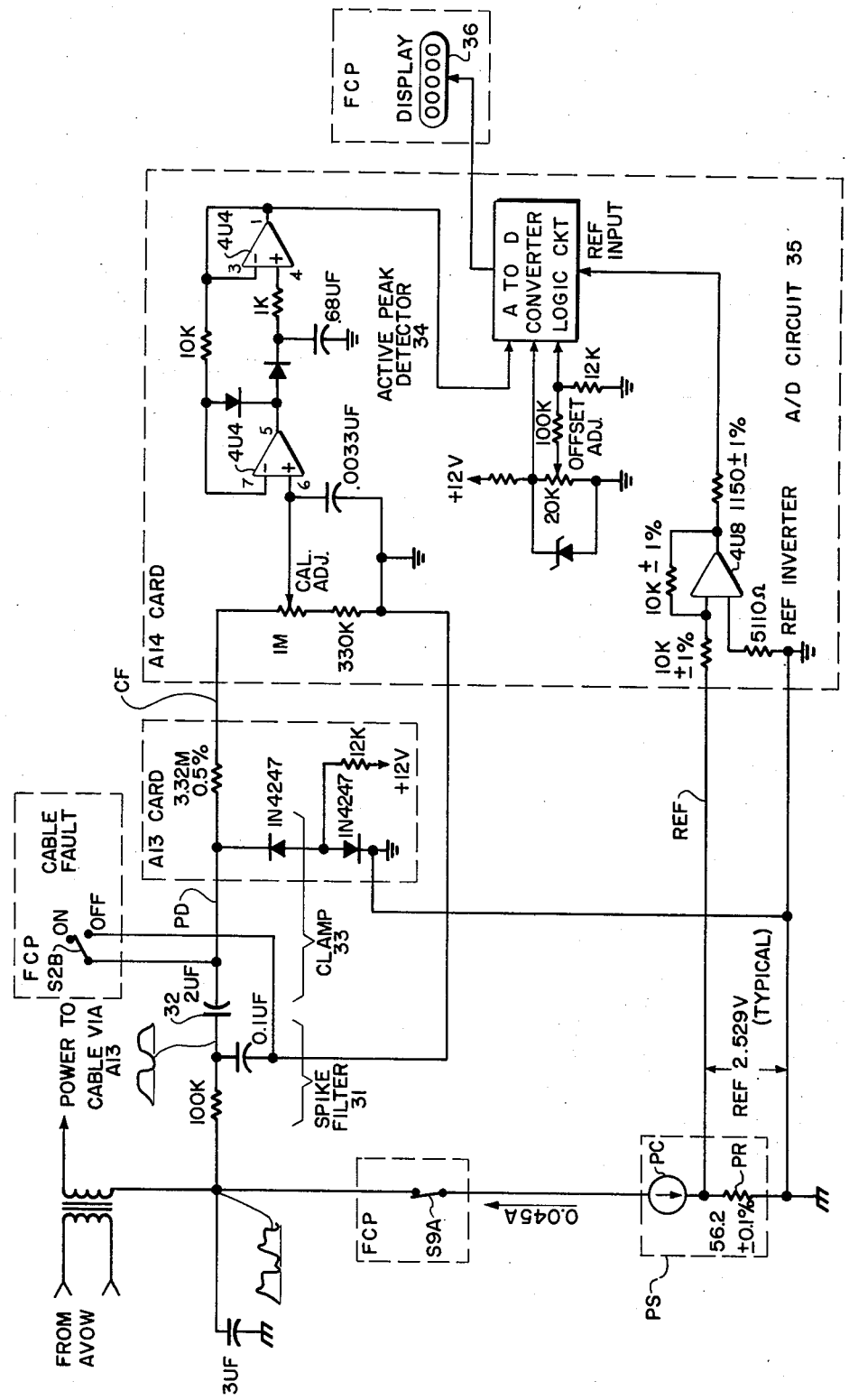
FIG. 4 is a functional block and schematic diagram of the cable fault locator circuits.
Figure 5:
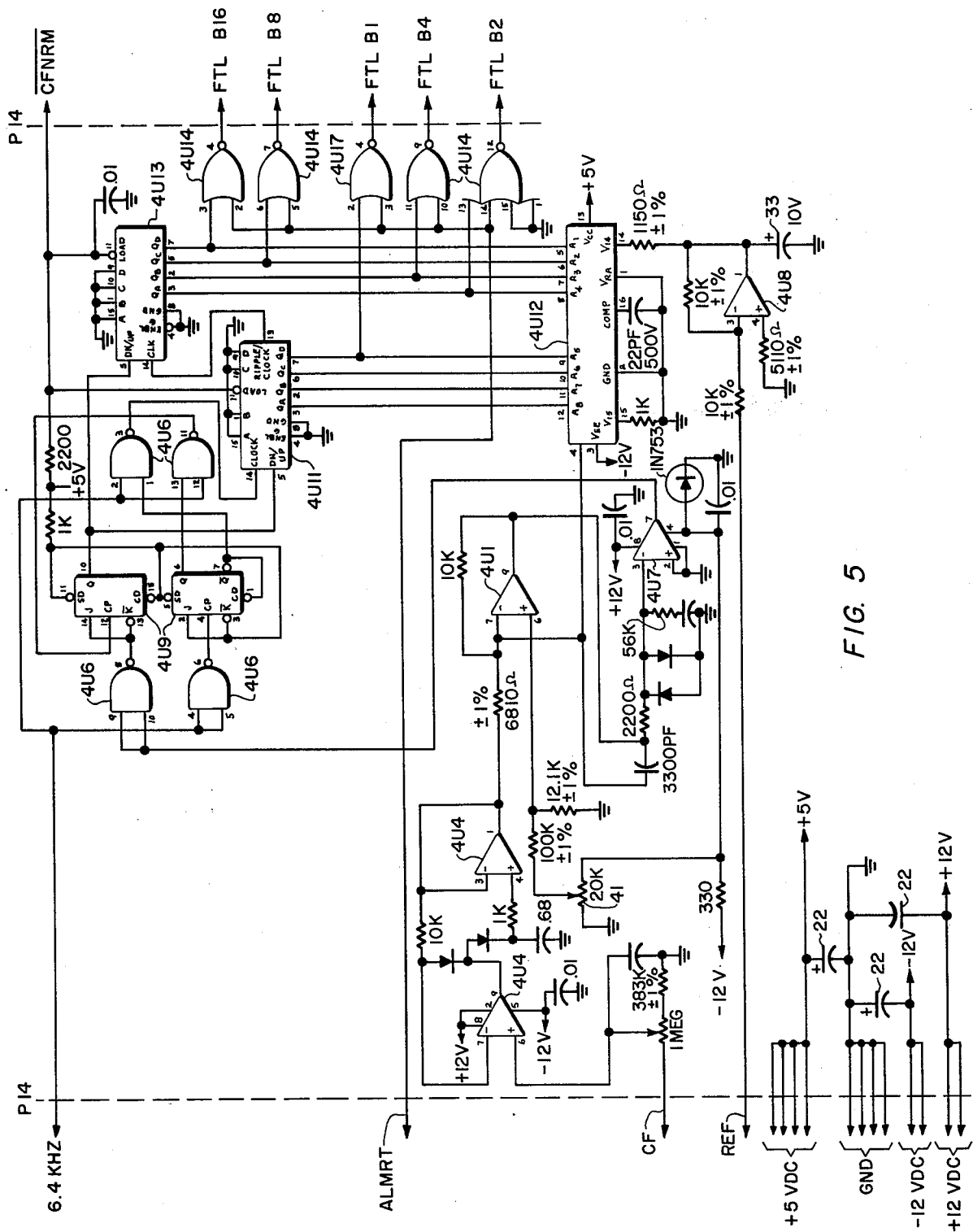
FIG. 5 is a schematic diagram of the peak detector and analog-to-digital converter of the fault locator.

D. Cable Fault Locator (FIGS. 4 & 5)

1. Functional Description

Analog voice orderwire printed-circuit card A14 contains the circuits needed to receive and transmit analog voice signals on supergroup cables. It also has circuits needed to generate the 1600-Hz ring signal used by both analog and digital voice orderwire circuits and the Cable Fault Locator circuits.

The cable fault measuring circuit is principally on the A14 card. Some of the components are however in the card file and on the supergroup driver/receiver card. FIG. 4 shows the overall cable fault circuit. The square wave from the cable is first filtered by a spike filter 31 whose components are located in the card file frame. The spike-free cable fault signal is then clamped by diodes on the supergroup driver/receiver card (A13). A voltage divider having low temperature drift is used to couple the clamped wave to the active peak detector on the A14 card. The output of the peak detector 34 is a dc voltage analogous to the number of restorers that pass data in the cable system. Analog-to-digital converter logic 35 converts this dc signal into a binary display that indicates the number of restorer halves that pass data plus one. Interchangeability is ensured by employing a precision 3.32-Megohm resistor on the A13 card and by bringing a precision reference voltage (on lead REF) analogous to the actual cable current from the power supply. Thus, power supplies, A13 cards or A14 cards may be exchanged without requiring readjustment of the A14 card. There are only two adjustments in the cable fault system. The OFFSET ADJ is set to read binary 00001 on the display when there are no restorers in the system. The CAL ADJ is then set to read the correct number of restorers in the system passing data plus one. This however is a factory adjustment performed with a simulator and does not normally require adjustment in the field.

2. Detailed Circuit Description

The analog portion of the cable fault circuit peak detector 34 and A/D converter 35 is shown in the schematic of FIG. 5. Both halves of 4U4 are set up as a peak detector circuit. The peak dc voltage is then fed to 4U1. This signal is then summed with a bias signal via resistor 41 and also summed with the feedback signal derived from pin 4 of 4U12 located in the lower right of the schematic; 4U1 acts as a comparator of the two dc levels and the feedback level coming from 4U12. The output of 4U1 is then fed to 4U7; 4U7 acts as a level set interface circuit to gate 4U6. The output of 4U7 is 0 or +5 volts depending upon the output of 4U1. The output of 4U6 is sent to count control flip-flops 4U9, located in the top center of the schematic. The output of 4U9 is the up/down control of 4U11 and 4U13, which are the up-down counters. The outputs of the up-down counters are used to drive the fault indication LED's located on the front panel via driving circuits 4U14 and 4U17. The outputs of up-down counters 4U11 and 4U13 also drive the 1508 D-to-A converter 4U12, located in the lower section of the schematic. The 4U12 output is fed back via pin 4 to 4U1, which is then used to null out the input voltage. The lower half of 4U9 is used to retime the clock pulse such that operation of the cable fault circuit is timed by both phases of the clock pulse. This means that the lower section of 4U9 drives the upper section of 4U9 to clock through data during one phase of the clock pulse; during the other phase of the clock pulse, the up-down counters are allowed to run. The up-down counters up-count or down-count to a point that the analog voltage output of 4U12 cancels the peak detector voltage at amplifier 4U1. The output of 4U7 is therefore a square wave causing the up-down counters to count up and down about the null voltage. This means that the equilibrium point is where the circuit settles around a given level and the up and down counting is around some given value. Under equilibrium conditions, 4U7 would normally have a square wave output, showing that its drive is causing the up-down counters to count up one count and down one count thereby staying around the equilibrium point. In the lower right of the schematic 4U8 is a gain-of-one inverting amplifier, which inverts the voltage reference signal and feeds it to pin 14 of 4U12 via resistor 42.

E. Front Panel

1. General

Figure 6:
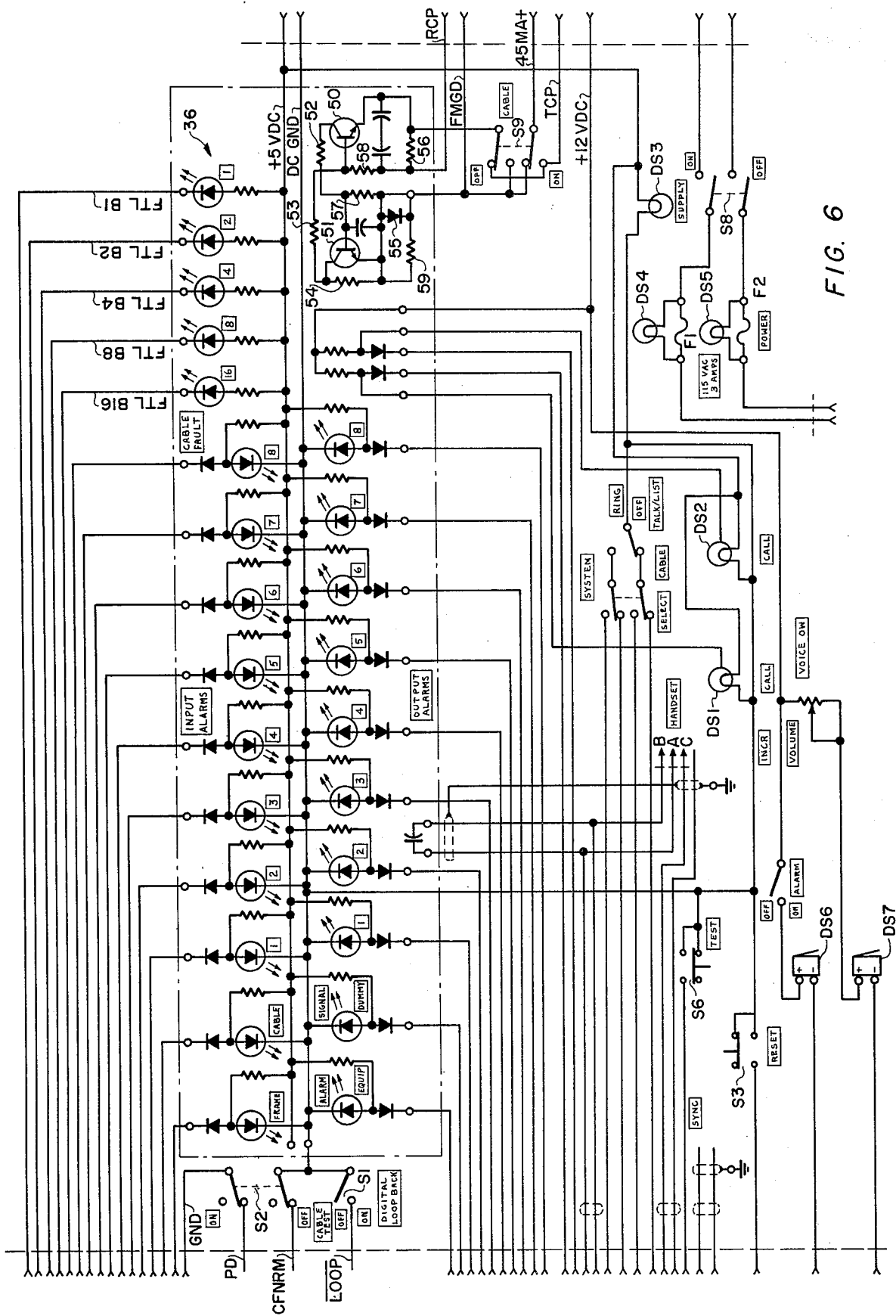
FIG. 6 is a schematic diagram of the front control panel.

Front panel circuits are shown schematically in FIG. 6. This circuit supplies external controls and indicators to perform necessary functions for fault isolation, analog and digital voice calls, line and cable power controls, and external oscilloscope sync.

2. Fault Isolation Circuits

Fault isolation circuits comprise light-emitting diodes (LED) on a panel card that is mounted on the rear of the front panel, cable test switch, digital loopback switch, and audible alarm circuit. The 20 light emitting diodes shown in two rows of ten each from the left side of FIG. 6 are controlled from the Alarm Detector Card. The five light emitting diodes connected to leads FTLB1, FTLB2, FTLB4, FTLB8, and FTLB16 comprise the display 36 controlled from the cable fault detector circuit on the analog voice orderwire circuit card (FIG. 5). Cable test switch S2 controls the cable fault test operations of the fault detector on the analog voice orderwire card A14. Setting the switch to ON sends out a high CFNRM signal that enables the cable fault output gates of the fault detector; setting the switch to OFF grounds CFNRM and inhibits operation of the fault output gates for normal operating conditions. Digital loopback switch S1 controls LOOP to the mode selector circuit on the supergroup driver and receiver circuit for circulating the NRZOUT data through receiver circuits. When AALRM from the alarm detector circuit card is applied to audible alarm DS6, the alarm actuates. Alarm reset switch S3 generates reset signal AARSSW and alarm test switch S6 generates test signal INAT. Both signals are supplied to alarm detector circuit card.

3. Orderwire Call Circuit

The orderwire call circuit comprises switches S5 and S7, call indicators DS1 and DS2, and connector J8. Switch S5 selects the type of call to be made (either analog or digital). With S5 in either position and S7 in RING position, the ring signal is supplied to the digital voice orderwire and analog voice orderwire circuit cards, respectively. With S5 in the same position and S7 set to the TALK/LIST position, the talk/listen signal is supplied to the analog voice orderwire circuit cards. Cable call indicator DS1 lights when the analog voice call signal is received from the analog voice circuit card. System call indicator DS2 lights when the digital voice call signal is received from the digital voice decoder circuit card. Audible call DS7 operates at a sound level determined by the "volume control resistor."

4. Power Control

Power is applied through switch S8 to the power supply. Indicator DS3, indicates that dc regulated voltage is being supplied. Power is fused by F1 and F2. Indicators DS4 and DS5 across the fuses light when the associated fuse is blown. Switch S9 controls the 45-mA constant-current power to the cable by providing control signals to the control panel circuit card and 45-mA power supply. When switch S9 is set to OFF, cable current is looped back. When switch S9 is set to ON, cable current is applied and its return grounded locally.

5. Cable Discharge Circuit Detailed Circuit Description

The cable discharge circuit is located on the printed-circuit card in the control panel. In FIG. 6 at the right there is a schematic of the cable discharge circuit. Under normal conditions with the multiplexer receiving cable power from the sending multiplexer, 45 mA of current from lead RCP enters the node of resistors 56 and 58. Thus, under these normal conditions, approximately 44.67 mA flows through resistor 56 and 0.33 mA flows down through the chain of resisitors 58, 53, and 54. With the 45 mA flowing, the voltage drop across resistor 59 is sufficient to forward bias diode 55, thereby causing a 0.7-volt drop across diode 55; resistor 58 drops approximately 1.58 volts; resistor 53 drops approximately 33.7 volts; and resistor 54 drops approximately 111.2 volts. The voltage drop across resistor 56 is approximately 6.566 volts. The voltage at the junction of resistors 58 and 56 is about 150 volts. At this point, the voltage at the emitter of transistor 50 is equal to 150 minus the voltage drop of resistor 56 (or 150 minus 6.566), which is equal to 143.4 volts. The voltage on the base of transistor 50 is equal to the series voltage drop of resistors 59, 54, and 53 or 0.7+111.2+33.7, which is equal to 145.6 volts. The voltage across the base emitter junction of transistor 50 is equal to 145.6 minus 143.4 or 2.2 volts. This 2.2 volts causes transistor 50 to be reversed biased, meaning it is in the off condition. With transistor 50 in the off condition, very little current flows through resistor 52 or resistor 57. This causes transistor 51 to remain off. This then is a normal operating mode of the current discharge circuit. Once the 45 mA of current falls off, the emitter voltage of transistor 50 still remains at approximately 150 volts due to the capacitance on its output. This capacitance is in part the 3-microfared bypass capacitor in the multiplexer; the voltage at the base of transistor 50 drops toward 0 volts. When this happens, transistor 50 becomes forward biased and causes it to turn on, allowing it to conduct current through resistors 52 and 57, which causes a voltage drop across resistor 57. This voltage drop then causes transistor 51 to turn on. Once transistor 51 turns on, it shorts out resistor 54. This allows less voltage drop at the transistor 50 base, which has a tendency to turn it on harder because it is allowing a greater forward bias. Increasing current through transistor 50 causes any voltage on its emitter to be discharged at a faster rate. Any residual voltage left on the emitter of transistor 50 is discharged very rapidly once this process is initiated. The purpose of the two back-to-back 15-mirofarad capacitors across resistor 56 is for audio bypass. The function of the capacitor across resistor 57 is to prevent transients on the base of transistor 51.

Figure 9:
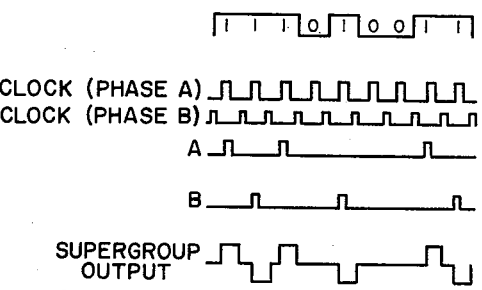
FIG. 9 comprises graphs of the driver timing.

F. Supergroup Driver/Receiver (FIGS. 7, 8, 9)

Figure 7:
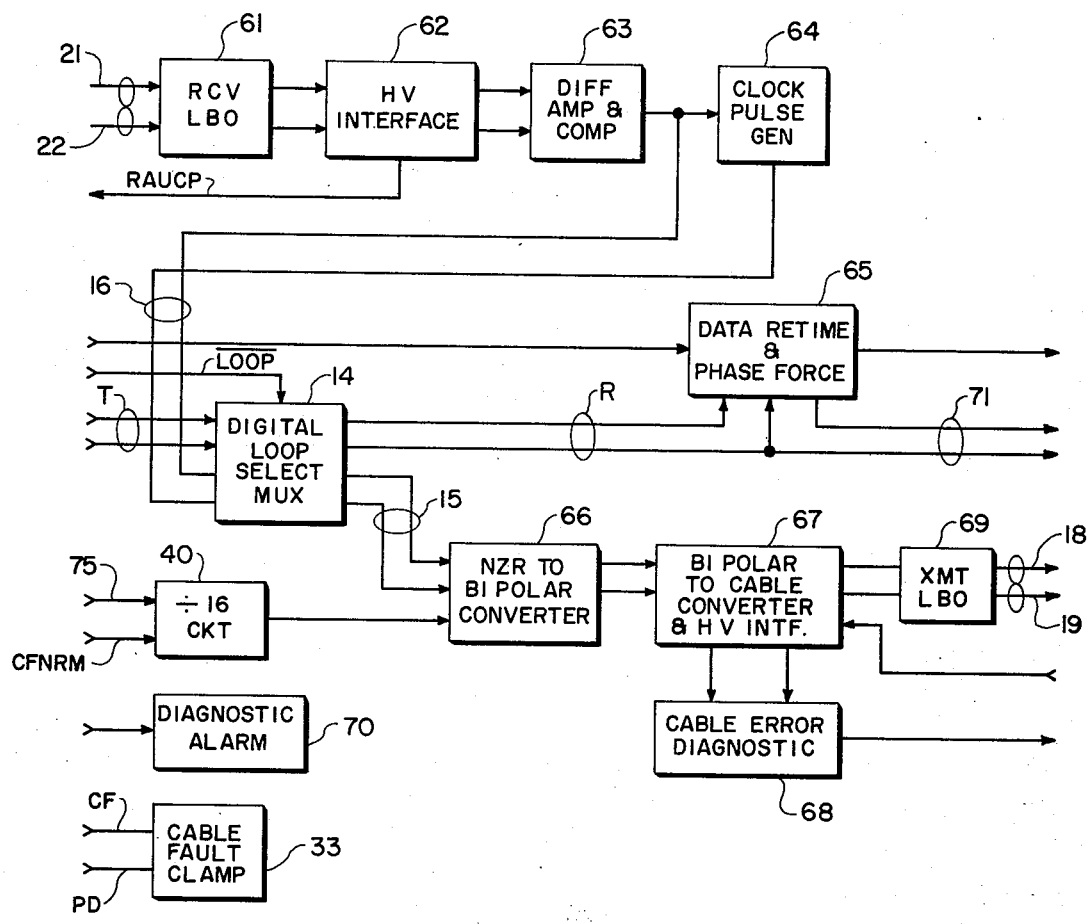
FIG. 7 is a block diagram of the supergroup driver/receiver.

The supergroup driver/receiver circuits are shown as a block diagram in FIG. 7, and by a schematic in FIG. 8. The driver timing diagram in FIG. 9. The information comprising data and timing on the two conductors of line T come from a combiner where eight PCM groups are combined. In the normal mode of the digital loop select multiplex gates 14, this information is supplied via line 15 to the driver, which in FIG. 1 is represented by block 17 with T2 and line build out circuits not shown, and in FIG. 7 comprises blocks 66, 67, 68, and 69. The receiver represented in FIG. 1 by block 24 and T1 is shown in FIG. 7 by blocks 61, 62, 63, and 64. There is also a receiver block 65 between line R from the multiplex gates 14, and line 71 to decombiner circuits of the multiplexer. The test clock 40 of FIG. 1 is shown in FIG. 7 as a divide by 16 unit to derive the 4.69 hertz square wave from a 75 hz. signal on lead 75.

1. Line Driver Functional Description

The $\frac{1}{2}$-baud bipolar supergroup bit stream pulses are generated from the digital combiner's output NRZ data stream, in the line driver, for transmission over the supergroup cable (FIG. 7). The coder sequencing, when applied to the cable driver, produces the $\frac{1}{2}$-baud bipolar signal illustrated in FIG. 9. The output is maintained when terminated in a cable $\frac{1}{2}$-mile long with a 56-ohm±10 percent impedance termination.

The cable driver input pulse, in combination with the primary inductance of the transformer circuit, acts to provide a sharp positive pulse upon turn-on and rapidly decays as a function of output transformer L/R ratio down to the transistor threshold level. When the phase B clock pulse occurs, the transistor starts to turn off and the regenerative action of the transformer feeds back a negative pulse speeding up the action. Characteristics of both the upper and lower cable driver halves are identical and the switch-timing occurs as shown in the timing waveforms.

2. Line Receiver Functional Description

The line receiver and timing regenerator extract NRZ data and timing from the supergroup streams. A stable crystal filter extracts NRZ data and timing from the 4.9152-Mb/s bipolar bit stream. Input isolation from the cable current source is accomplished by the input transformer and input filter networks. The transformer output is matched to provide an input data cable termination of 56 ohms, ±10 percent.

3. Detailed Circuit Description

The supergroup driver/receiver is on PC card A13 in the multiplexer. The following description contains two sections. The first section is the digital or logic circuits and the second section is the analog or linear circuits. The schematic (FIG. 8 has two sheets. Sheet 1 is primarily the supergroup receiver section and sheet 2 is primarily the driver for the supergroup output.

The receiver starts in the upper left of sheet 1 and is involved initially in the upper section of switch 3S1 that, with its associated discrete components, is the receiver line buildout 61 or cable equalization. The supergroup signal is then applied to pulse transformer T1 in the interface circuit 62 and on through differential video amplifier U4 of the circuit 63. This amplifier's output is then applied in a dual mode through the components to the right of it, which are the threshold circuit, and applied to dual comparator U9. At this point, a bipolar-to-polar conversion of the received data is made, which is then combined at gate U3. The polar data is still $\frac{1}{2}$-baud or 100 nanoseconds wide for ONE's. The gate U3 data output is applied to two areas, one being the clock generator circuit 64 at transistors Q1 and Q2 and gate U2, just below the U3 area, and the other a crystal filter timing function, triggered by the incoming received data ONE's. The timing logic interface is inverter U6 to its terminal 12.

The timing and data of the receiver are then applied via the two leads 16 to U8 of the digital loop select multiplexer 14 used for selecting the normal or digital loopback operations. In the normal mode, the received data and timing are outputted via the two leads R to two flip-flops U1 of the data retime unit 65. This converts the $\frac{1}{2}$-baud polar data to full width data; flip-flops U1 and gate U3 are the 48-channel mode clock phase forcing circuit 65. These outputs are applied as the received data and received master clock to the common equipment of the demultiplexer.

In addition, U8 of the multiplex gate unit 14 receives the supergroup data and timing via two leads T from the multiplexer driver section and in the normal mode, via two leads 15 applies this data and timing to two flip-flops U5 of the NRZ-to-bipolar converter 66. The output of flip-flops U5 is applied through gates U7, which are strobed with the clock pulse to generate the ½-baud pulses and on through inverters U6 as buffers to the bipolar-to-cable drivers 67. The bipolar drivers are involved at transistors Q4 and Q6 and on through transformer T2, whose output is then applied to the lower section of switch 3S1 on sheet 1 with its associated discrete components as the transmit line buildout 69 or cable equalization function. The output of this line buildout is applied via leads 18 and 19 to the supergroup cable center conductor and shield and is the output of the driver or multiplexer section.

In the lower right of the schematic, sheet 2, the cable error diagnostic circuit 68 comprises the two sections of pack U11 which are the traffic detectors for the bipolar data and are used to generate the cable signal alarm whenever either one or both of these drivers does not generate ONE's for a reasonable period of time. In the clock circuit 40 pack U10 and gate U7 are involved in the cable fault system and apply a 4.69-cycle modulation to the U5 converter. In this mode, the normal supergroup data is applied to the cable for one-half of this period and all ZERO's are applied for the other half.

Multiplexer unit U8, when selected in the digital loop-back mode, applies the received data and timing directly to the NRZ-to-bipolar driver 66. The NRZ data and timing from the multiplexer combiner is also applied directly to the demultiplexer receiver data and timing. This generates a dual loop function when digital loopback is selected (that is, as a self-test, the multiplexer data and timing are applied directly to the demultiplexer and, in a system mode, the receive data and timing are looped directly to the cable driver, such that a far end multiplexer can test a complete cable system).

The 33 microhenry choke L1 is used to compensate the amplifier to give roll-off to orderwire audio. The rest of the input circuit to the video amplifier consists of resistors, R2 through R6, which are balanced to ground and serve to attenuate the signal to keep from over driving the 733 amplifier U4. Capacitor C4 is a high-frequency noise filter. Diodes CR6 and CR7 are limiters to prevent the input signal of more than one diode work function from appearing differentially at terminals 1 and 2 of the video amplifier. The gain control loop of the 733 amplifier U4 between pin 4 and pin 9 is as follows: R8 sets the DC gain while L2, C3, and R7 set the equalization, which performs the inverse equalization for ½ mile of CX-11230 cable. The outputs of the 733 video amplifier appear on terminals 6 and 7 and are capacitively coupled to a pair of threshold detectors.

Starting at pin 7, the signals go through capacitor C8, then through noise filter R12 and C10 to pin 6 of a 1514 comparator U9. The noise filter admits the eye pattern to pin 6 of U9. Also connected to capacitor C8 is resistors R11, R13, and diode CR8, which form the rectifier for a DC threshold for ½ of circuit U9 that is approximately 90% the peak value of the signal minus the forward drop of diode CR8. To complete the filtering, resistor R20 and capacitor C11 act as a stretcher to make the signal at pin 5 of U9 appear as DC. Resistor R14 is connected to a bias point of −7.5 volts; this is intended to force the output of U9 to stay in a continuous zero state in the absence of a signal from the cable and to *facilitate the cable fault location operation*. Out of pin 6 of the video amplifier through capacitor C9, the same threshold circuits are repeated for the opposite polarity of the eye pattern. The noise filter is resistor R17 and capacitor C12 with the signal being impinged on pin 13 of the type 1514 pack U9. The rectification process takes place by voltage division resistors R16 and R18 through diode CR9 with the DC filter being R19 and C13. The bias to −7.5 V is resistor R15; this threshold voltage is now on pin 12 of U9.

When the signals exceed the threshold value either from pin 7 or pin 6 of the video amplifier, the output of U9 gives a ground on either pin 8 or pin 1, giving a ONE condition. These signals at the input of U3 cause a digital high to appear at pin eight of U3 on the output side. The reason for having the two threshold circuits, one for the positive-going type of eye pattern and one for the negative type of eye pattern coming out of the video amplifier, is due to the yield from the 733 amplifiers U4. They have a DC drift, and if the DC drift is such that either side pin 7 or pin 6 could go into saturation, then the threshold of the saturated side could be governed by the peak value of the unsaturated side and errors could result. Separate threshold and detector circuits enable the 733 amplifiers to operate over a wide temperature range.

Timing recovery is accomplished on the line from pin 8 of U3 and is capacitively coupled through capacitor C18 into transistor Q1. Transistor Q2 is simply a high gain stage with its collector circuit resonated to the 4.9152-MHz crystal frequency. The output of Q2 is coupled through capacitor C26 to a 710 type comparator U2. Input diodes serve as limiters to prevent the sine wave excursion from overdriving the 710 circuit U2. Bias resistor R58 connected to the −7.5 volt point, stops the timing if there is an interruption in data from the cable. This prevents any residual noise of the cable system from generating extraneous timing pulses which could adversely affect the cable fault mode of operation. The output of U2 at pin 7 is the received timing to U6 (9016). Neutralizing capacitor C21 is used to neutralize the capacitance of crystal Y1. Capacitor C24 is a resonating capacitor and broadly resonates with inductor L7 and the fixed capacitor C23 at 4.9152 MHz; capacitor C24 also is used to trim the phasing of the timing such that system jitter is within the timing recovery zone and the recovered data is error free.

The integrated circuits shown in FIGS. 5 and 8 are as follows:

| FIG. 5 | FIG. 8 | Type |
|---|---|---|
| 4U7 | | 710 |
| | U4 | 733 |
| 4U1, 4U4, 4U8 | | 747 |
| 4U12 | | 1508 |
| | U9 | 1514 |
| 4U6 | | 9002 |
| | U3, U7 | 9003 |
| | U6 | 9016 |
| 4U9 | U1, U5 | 9024 |
| | U10 | 9316 |
| | U8 | 9322 |
| | U11 | 54123 |
| 4U11, 4U13 | | 54191 |

In FIG. 8 the other component types or values are:
Transistor Q1 is type 2N2222A, Q2 is 2N918, and Q3, Q4, Q5, Q6 are each type 2369A. Many of the diodes shown without a circle are type 1N4245; except CR6, CR7, CR8, CR9, CR10, CR11, CR12, and CR13 are each 1N4153; and CR18 and CR19 are each type 1N4247. The two voltage regulators in the power supply at the bottom of sheet 1 are type 1N755A; and others are type 1N752A.

| Resistors | Ohms |
|---|---|
| R9, R10, R21, R60 | 10 |
| R27, R30, R39, R41 | 12 |
| R3, R4 | 18 |
| R24, R25, R32, R33, R35, R36 | 33 |
| R43, R44 | 10 |
| R12, R17, R23, R34, R37, R46 | 47 |
| R7 | 56 |
| R2 R5, R6 | 82 |
| R22, R56, R59 | 100 |
| R54 | 120 |
| R11, R16, R61, R79 | 220 |
| R47, R48, R49, R50 | 470 |
| R26, R28, R29, R31, R38, R40, R42, R45 | 560 |
| R1, R8, R55, R62, R63 | 1000 |
| R77 | 1200 |
| R51 | 1500 |
| R13, R18 | 1800 |
| R52 | 2200 |
| R53, R69, R70 | 3300 |
| R57, R78 | 4700 |
| R71, R73 | 5600 |
| R19, R20 | 8200 |
| R66 | 10K |
| R68 | 12K |
| R80, R81 | 22K |
| R14, 15 | 68K |
| R58 | 120K |
| R64, R65 | 121 ± 1% |
| R67 | 3.32 Meg. ± 1% |
| R74, R76 | 196 ± 1% |

| Capacitors | Value |
|---|---|
| C43, C44 | 22 picofarads |
| C23 | 33 picofarads |
| C10, C11 | 47 picofarads |
| C19 | 56 picofarads |
| C3 | 270 picofarads |
| C4 | 330 picofarads |
| C2, C5, C16, C17 | 4700 picofarads |
| C8, C9, C14, C15, C18, C20 C26, C28 C29, C31, C32, C33, C35, C36 C39, C40 | .01 microfarads |
| C1, C46 | .033 microfarads |
| C47, C48 | .047 microfarads |
| C6, C7, C11, C13, C22, C27, C45 | .1 microfarads |
| C42 | 6.8 microfarads |
| C30, C34, C37, C38, C41 | 22 microfarads |
| C21 | variable 2-8 picofarads |
| C24 | variable 9-35 picofarads |

| Inductors | Microhenries |
|---|---|
| L2 | 3.3 |
| L3, L4, L5, L6 | 4.7 |
| L7 | 15 |
| L1 | 33 |

A more extensive description of the system is found in a Research and Development Technical Report available from the National Technical Information Service as Number AD-A026573.

Figure 10:
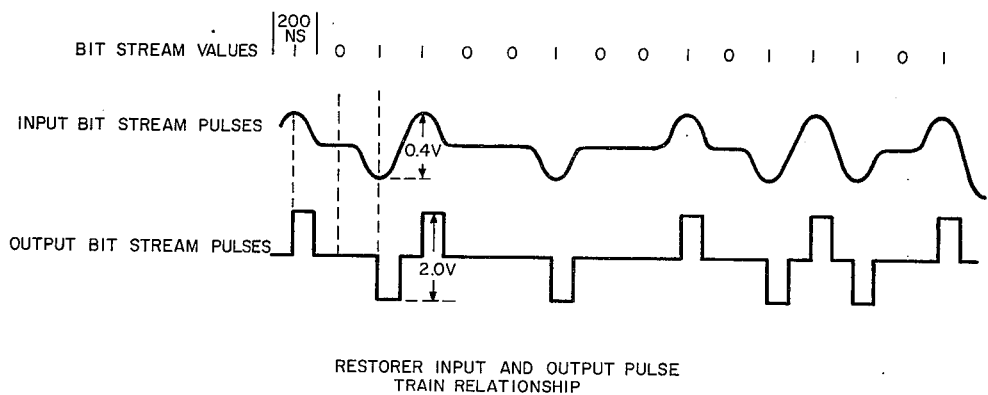
FIG. 10 comprises graphs of the pulse form restorer input and output pulse train relationships.
Figure 11:
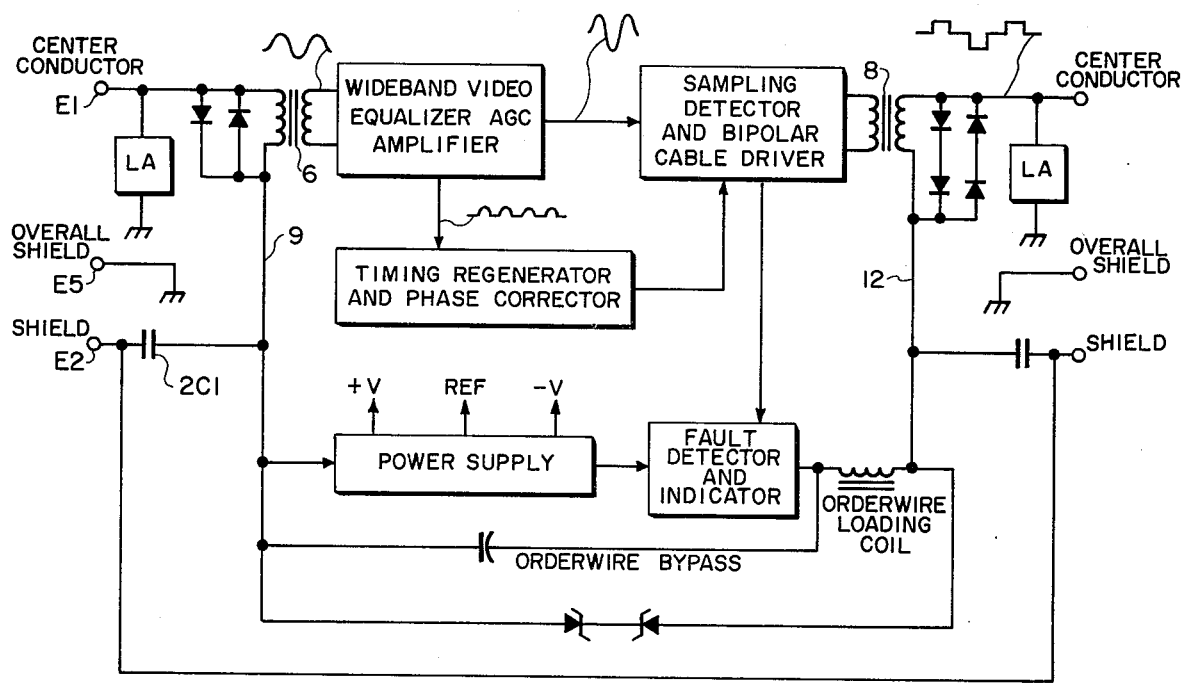
FIG. 11 is a block diagram of one half of a pulse from restorer.
Figure 12:
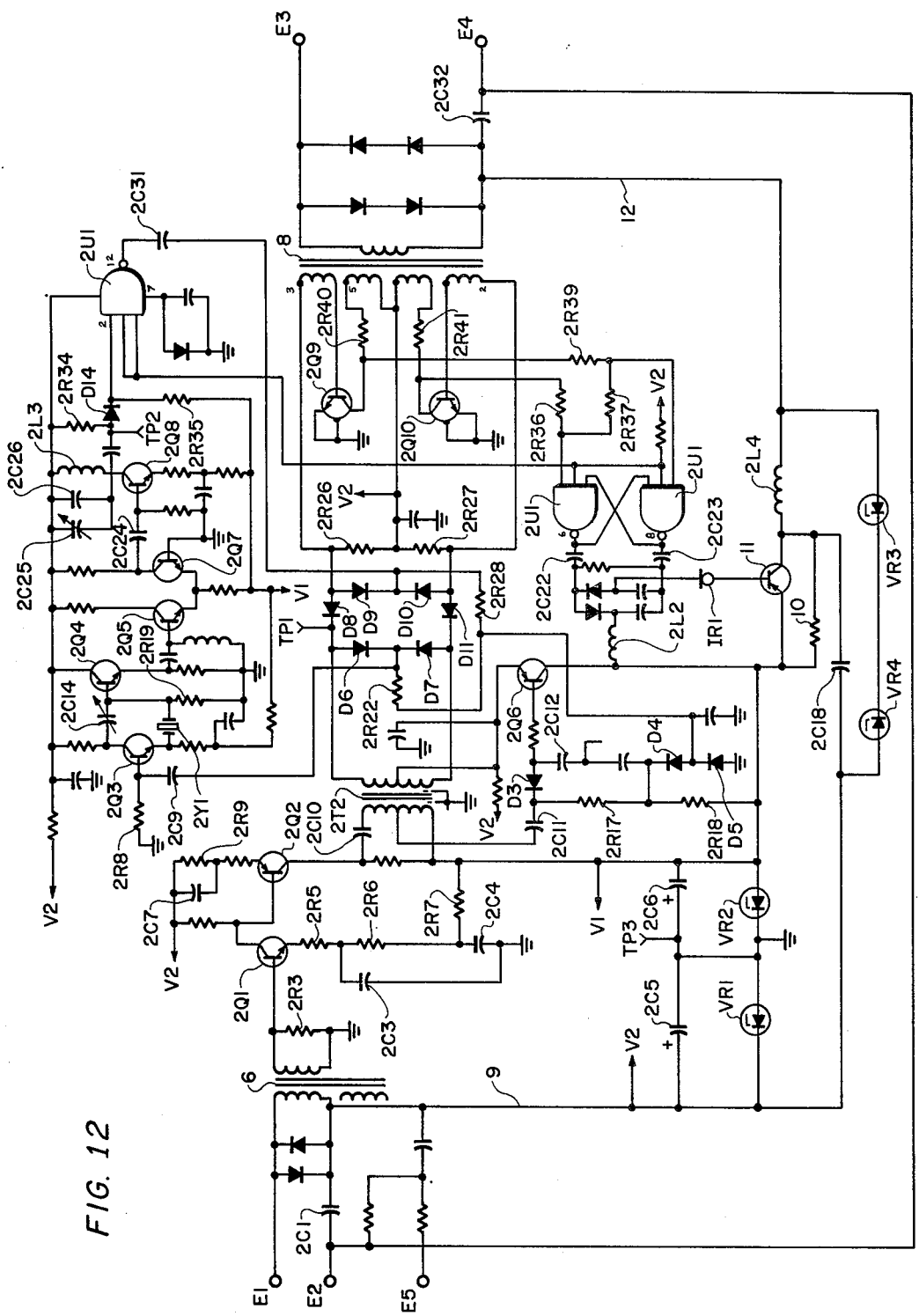
FIG. 12 is a schematic diagram corresponding to FIG. 11.

G. Pulse Form Restorer (FIGS. 10, 11, 12)

1. General

The Pulse Form Restorer (PFR) is a rugged, lightweight, compact cable repeater that provides high-speed (4.9152 Mb/s) duplex data regeneration of bipolar signals of the type generated by the multiplexer. The restorer is compatible with the CX-11230/G cable. It is also compatible with the CX-4525/G cable.

The restorer circuits receive an attenuated and distorted 4.9152-Mb/s digital pulse train from an input coaxial line and produce a regenerated digital pulse train that is transmitted on an output coaxial line. Each restorer chassis contains two identical circuits for transmission in two directions over two coaxial lines. The restorer performs three functions in regenerating a pulse train:

a. It amplifies and equalizes the received signal to compensate for signal attenuation due to transmission through one-half mile of coaxial line.

b. Resynchronizes the output pulse train to the basic transmission bit rate.

c. Generates bipolar pulses of the proper width for transmission on the output coaxial line.

The restorer contains circuits that detect malfunctions by monitoring its output pulse train. It also provides a transmission path for analog voice orderwire signals. The voice orderwire signals and dc power for use by the restorer travel on the same conductor with the pulse train, originating in the Multiplexer at the transmission end of each line. Voice signals and power are provided independently to each of the two identical restorer circuits through the associated input line. Each circuit provides a network at audio frequencies to shunt the analog voice signals from the input line to the output line around the pulse train processing circuits. The audio path is also connected to a U-79/U connector to permit maintenance personnel to tap into the cable audio circuit at the restorer by using a test set which contains an orderwire circuit and handset connector. The voice signals are not amplified in the restorer; they are merely passed through the restorer with a minimum loss.

The cable power supply in each Multiplexer is a 45-milliampere constant-current source that supplies power to each restorer in the transmission line. To provide transmission for up to 5 miles, as many as nine restorer units may be used in the transmission line. A single Multiplexer may power the entire cable system—out and back for 18 restorer halves in series; or each end may—by switch—power its respective outbound 5-mile link. The direct current on each restorer input line is series tapped to provide power for the associated circuit card. The power circuit on the card is filtered and regulated to prevent the voice and pulse signals from affecting the operating components. Power for restorer units farther down the transmission line is shunted from the input to the output both around and through the pulse processing circuits.

When the output pulse monitoring circuit on the PC card in a restorer detects a failure in the output pulse train, the power circuit shifts to demand an additional 2.5 volts. The shift can be detected at the Multiplexer that supplies the power and is used to determine which restorer in the transmission line has failed.

The relationship between the pulse train coming into the restorer from the input line and the output pulse train being transmitted out the output line is illustrated in FIG. 10. The restorer amplifies the input signal, restores the proper timing to the pulse train, and restores the desired shape to the output pulses. The input pulses from the cable have been reduced in amplitude to approximately 0.4 v peak to peak and distorted in shape by the attenuation along the input cable. After amplification and equalization, the pulses are approximately sinusoidal in shape, and 200 nanoseconds in duration. Each output pulse is ±1.0 v peak and 100 nanoseconds wide.

The output pulses have also been resynched to the basic 4.9152-MHz bit rate. This timing correction eliminates minor variations in pulse width and jitter that may have been introduced into the bit stream during transmission through the input cable.

The mechanical design comprises an aluminum casting with machined finished surfaces where required for seals and screw threads. An H-shape structure between the two end plates or connector mounting surfaces serves as a mounting surface for the two printed wiring assemblies. The printed wiring cards also complete the stress torque box of the H-shaped structure and the structure also serves as an electronic shield between the two printed wiring assemblies.

To complete the assembly of the restorer, the structure, printed wiring assemblies, connectors, and associated hardware and components are inserted into a cylindrical cover that is clamped in place by a gland or jam nut. This completes the O-ring seal at each end of the structure for water immersion requirements. In addition, this technique places a prestressed tension load on the main structure, thereby further rigidizing the complete assembly.

The rigidity of the structure has been accomplished in a manner to preclude degradation of the maintainability and waterproof features of the equipment. By removing the gland nut and cylindrical cover, the printed wiring board assemblies are completely exposed for repair or replacement.

The restorer has been packaged in a volume that is 4.00 inches in diameter by 9 inches long (113 cubic inches) and weighs 5.0 lbs.

The printed wiring cards are constructed from doublesided, copper-clad, glass-epoxy material and finished with a solder coating. The components are mounted on the board in a conventional horizontal manner followed by a wave or flow solder procedure.

The general electrical characteristics for the restorer are:

4.9152 Mb/s data rate
Full-duplex operation
Built-in fault detection
Analog orderwire capability (880 ohms±10% impedance)
Compatible with CX-11230/G cable
Input impedance 56 ohms
Output signal (Bipolar) ±1.0 V±100 mB, 100-nanosecond±10% pulse width
Timing jitter ±20 nanoseconds
Error rate of less than 1 per minute
MTBF more than 3500 hrs
Operating temperatures range −50° F. to +125° F. plus sun load
Less than 200 cubic inch volume
Weight 5 lbs
Operate with 45-mA cable current The restorer has been designed such that all equipment interfaces are protected from the effects of short circuits, overvoltage, overcurrent, lightning, and EMP. Lightning and EMP hardening is accomplished by the use of clipping diodes, zener diodes, and lightning arrestors at the cable interface.

Since the cable voltage is dropped in series for each PC card, voltages are as high as 325 volts between the PC card and the shield ground. When the restorer is fully assembled, the operating personnel are protected. The production design calls for two warning labels placed in conspicuous locations on the H frame to direct the operating personnel not to operate the unit unless fully assembled. In depot maintenance, the potentials are less than thirty volts, for the envisioned maintenance will be on a single restorer in a test fixture. Personnel are protected from cable voltage on the orderwire interface connector with a capacitor isolation between the cable and the orderwire access connector.

Operation with the CX-4525 cable with adapter cables requires that the restorer ground posts be effectively grounded as the CX-4525 outer shield is not carried to the restorer via the adapter cables. If the PC card were to short to the case or if the lightning arrestor were to short out, the restorer shell would become connected to the cable voltage. The CX-11230 cables incorporate an overall shield ground. Personnel should ascertain that the overall shields are properly grounded at the terminals of the cable system.

2. Functional Description

FIG. 11 is a functional block diagram of the pulse form restorer. It consists of seven major functional parts:

a. Data recovery
b. Timing regenerator
c. Cable driver
d. Fault detector
e. Orderwire facility
f. Internal power supply
g. EMP and transient protection The data recovery portion recovers and conditions the distorted video from the cable system. This is accomplished with transistor amplifiers and equalization circuits.

The timing regenerator derives the timing signal from the received data stream and provides accurate retiming where the transmitted sequence timing depends solely on the derived time signal. To obtain the timing signal, the data stream is processed through a back-biased full-wave rectifier (for noise suppression in the absence of signal) and a high Q tank circuit. Phase-locked loops could also be used for this purpose but studies indicated they were not cost effective.

The back-to-back diodes at the input and output transformers are for EMP protection while the lightning arrestor, required by specification, prevents voltage rises about 500 volts (typical) between the center conductor and the case. The back-to-back Zener diodes provide EMP protection to the orderwire bypass circuits.

The orderwire is simply a load coil technique that stabilizes the data bypass capacitors in conjunction with cable load and load coil itself to pass audio frequencies down the cable with very little loss.

3. Fault Detection Consideration

A reliable technique for detecting a repeater fault was developed. Although no fault mechanism can provide 100 percent detection capability (i.e., the fault circuits themselves can fail), a good measure of correct repeater operation is afforded by suitable monitoring of the regenerated data present at the collectors of transistors 2Q9 and 2Q10 (FIG. 12).

Under normal conditions, the signal at the respective collector is a clean switching waveform that is TTL compatible. The fault detection scheme in the pulse form restorer is based upon this effect.

Five major fault detection parameters were satisfactorily resolved by hardware:

a. Pattern density variation
b. Attack time c. Hold time
d. Release time
e. Accuracy requirements The first four of these are interrelated by the system fault detection philosophy and data format. The system was designed for relatively long coast periods of up to 144 consecutive ZERO's in the supergroup pattern. Otherwise, excessive noise might be introduced into the analog voice orderwire, and possible low-rate supergroup errors could develop. Since the fault locator of the multiplexer operates at 4.68 Hz, the solution is constrained between 4.9152 Mb/s/144 or 34,133 Hz and 4.68 Hz, the original design parameters.

The fifth parameter is accuracy. The end result of the restorer fault detection is to generate an additional known voltage in series with the cable system. This voltage is controlled by inserting a 56.2 ohm±0.1% wirewound resistor in series with the cable current. The voltage drop per restorer is the cable current times the 56.2 ohms. If the cable current were exactly 0.045 Amperes, the voltage drop per restorer would be expected to be 2.529 volts. There are, however, second order effects that cause the voltage to differ slightly from the expected value. The switching transistor in parallel with the series resistor is not a perfect switch. Moreover, the Zener diodes in the restorer power drop circuit change their voltage drop slightly due to data on vs. data off conditions. The combined second order effects have been found in the laboratory to average +0.061 volts per restorer circuit, or 2.590 volts total drop per circuit. The second order effect is therefore 2.3% of the total drop. The overall accuracy is controlled by the variation of the second-order effects that are therefore third order and do not significantly affect the overall accuracy of the fault locating system. The accuracy of the cable current itself is of little significance for cable current variations are compensated for in the reference voltage and measuring circuit located in the multiplexer. Hence, cable current variations of several percent do not appreciably affect the cable fault location measurements.

4. Power Supply Considerations

The internal power supply designed for the restorer is regulated by Zener diodes in a series drop configuration. It does not interrupt normal analog voice orderwire operation even though the restorer itself might malfunction.

5. Analog Orderwire Considerations

The restorer is required to operate properly in the presence of an analog cable orderwire signal. In addition, it must have a low insertion loss (commonly called flat loss) and match an 880-ohm±10 percent orderwire impedance between 300 Hz and 1700 Hz that provides proper loading to the cable system for the AVOW, (analog voice order wire) bypass of the digital regeneration, circuits, isolation of the orderwire to prevent digital errors, and full orderwire operation in the event of restorer failure.

H. Detailed Circuit Description of Restorer (FIG. 12)

1. Video Amplifier

The input signals from the cable center conductor enter through terminal E1 on the PC card of the pulse form restorer (FIG. 12). The shield is connected to terminal E2; and an audio orderwire loading capacitor 2C1 of 0.033 microfarads. Its function is to work in conjunction with inductor 2L4 (45 millihenries) and capacitor 2C32 (0.033 UF) to form an orderwire bypass. The network forms an 880-ohm low-pass filter that routes the orderwire and cable current around the pulse form restorer. Capacitor 2C18 is 10 microfarads, and VR3 and VR4 are type 1N3029A. The digital signals find a very low impedance path through capacitor 2C1 to the transformer 6 input and from the transformer 8 output through capacitor 2C32 to the cable. On the input side, EMP protection is provided by back-to-bakc 1N4245 diodes across the transformer primary. The supergroup signal is coupled through the input transformer 6 that has a 1-to-1 ratio. The secondary winding couples the signal into the video amplifier. Resister 2R3 is a 56-ohm termination that is reflected 1-to-1 to the primary side of transformer 6 to load the CX-11230 cable properly. Transistor 2Q1 is the first input stage. Its emitter circuit has equalization parameters, an 82-ohm resistor 2R5 together with capacitor 2C3 (330 pF) to ground. The other part of the equalization consist of a 1 K resistor 2R6. The circuit resistor 2R7 (820 ohms) and capacitor 2C4 (0.1 UF) provides degeneration to any audio entering the transistor 2Q1 circuit as well as decouple the negative power source. Transistor 2Q2 (type 2N3251A) is the second stage of the video amplifier. The emitter circuit further degenerates any orderwire audio with 220-ohm resistor 2R9 and 0.1 microfarad capacitor 2C7. The transistor 2Q2 output is AC coupled through 0.1-microfarad capacitor 2C10 into a 2:1 step-up transformer 2T2. The signal that is impressed across the primary winding is therefore coupled 1:1 across each half of the secondary winding. The net gain of the video amplifier and the transformer results in an eyepattern when seen on the secondary side of the trasformer 2T2 at test point TP1 (relative to the ground plane) of three volts peak-to-peak (typical).

The collector of transistor 2Q1 has a 1000 ohm resistor to V2. The emitter of transistor 2Q2 has a 33 ohm resistor, and its collector has a 330 ohm resistor. The input terminal E5 from the overall shield is connected to terminal E2 by two series resistors of 3900 ohms and 1 megohm, and their junction is connected by a 0.1 microfarad capacitor to V2.

2. Variable Threshold Circuit

The center tap on the primary side of transformer 2T2 divides the video signal in half. This signal is coupled through capacitor 2C11 into the variable threshold circuit consisting of transistor 2Q6 and other circuit components; diode D3 rectifies the signal coming from the video amplifier and a peak type of detector uses filter capacitor 2C12 (0.1 UF). This dc voltage together with bias is impressed through resistor 2R20 onto the base of transistor 2Q6 (type 2N2907A). The output emitter signal of transistor 2Q6 is returned to the secondary winding center tap of transformer 2T2 as a dynamic threshold signal that is dependent upon the input signal level from the cable system. Operating bias for transistor 2Q6 is determined by diodes D4 and D5 that represents two forward diode drops from current flow through them from resistor 2R18 (1000 ohms), which is connected to the minus 6 volt supply. The circuit of diodes D4 and D5 also provides thermal compensation for the drops of diode D3 and the transistor 2Q6 emitter-base diode. This provides temperature tracking for the threshold voltage circuit.

The emitter and base resistors of transistor 2Q6 are 4700 and 1000 ohms respectively and the emitter has a 0.01 UF capacitor to ground. Resistor 2R17 is 3300 ohms, the capacitors from diode D4 cathode and anode respectively to ground are each 0.01 microfarads.

3. Timing Recovery Circuit

The signal at test point TP1 from transformer 2T2 is full-wave rectified by diodes D6 and D7. The full-wave rectified signal is coupled through capacitor 2C9 (0.01 UF) and resistor 2R8 (4700 ohms) to the base of transistor 2Q3; resistor 2R22 (3300 ohms) is connected to a minus 0.7-volt bias point at diode D5. This bias voltage permits the tops of the signal to be coupled to transistor 2Q3 for the purpose of timing recovery. This bias also serves an important function during the no-signal condition during *cable fault measurement.* In the no-signal condition, it is required that the retiming recovery chain cease all timing outputs. Otherwise, spurious outputs could force the traffic detector into false operation. The negative 0.7 volt from diode D5 to resistor 2R22 provides a backbias to diodes D6 and D7 such that no small noise signals will enter the timing recovery circuit. Transistor 2Q3 is a split-phase amplifier of unity gain. The emitter of this amplifier is coupled through 2Y1, a 4.9152 MHz crystal, to a common point with the coupling from the collector via neutralizing capacitor 2C14 to the base of transistor 204. Neutralizing capacitor 2C14 is adjusted to null the effect of the crystal holder capacitance. Its adjustment will be described later. The circuit bandwidth and phase delay characteristics of the crystal filter are held constant by resistor 2R19 (2200 ohms). The remaining circuit is isolated from the filter by transistor 2Q4, an emitter follower, used to couple the signal into amplifier transistor pair 2Q5 and 2Q7. A 220 microhenry inductor is between the base of transistor 2Q5 and ground. The output of the amplifier 2Q5/2Q7 is coupled through capacitor 2C24 (0.01 UF) to transistor 2Q8. Transistor 2Q8 drives gate 2U1 at pin 2. The transistor 2Q8 collector is resonated with inductor 2L3 (15 microhenries) and capacitors 2C25 and 2C26 (22 PF) in parallel to 4.9152 MHz. An approximate 6-volt peak-to-peak sine wave is established at test point TP2. This sine wave is coupled through diode D14, resistors 2R34 (1500 ohms) and 2R35 (4700 ohms) to the gate input of the 9003 on pin 2 (2U1). The purpose of diode D14 is to prevent the timing swing from going negative on input pin 2 of the 9003 gate. The gate 2U1 output on pin 12 is a square wave at 4.9152 MHz. This square wave is differentiated through capacitor 2C31 (150 PF) and coupled to resistor 2R28 and the analog AND gate timing inputs at the cathodes of diodes D9 and D10.

The collector of transistor 2Q4 is connected via a 100 ohm resistor to V2, a 0.015 microfarad capacitor to ground, and a 470 ohm resistor to the collector of transistor 2Q3. From the emitter of transistor 2Q3 there is a 470 ohm resistor and then a 220 ohm resistor to V1; and from their junction a 0.01 UF capacitor to ground. At the emitter of transistor 2Q4 there are a 4700 ohm resistor to V1, and a 0.01 UF capacitor to the base of transistor 2Q5. Transistors 2Q5 and 2Q7 have respective collector resistors of 220 and 1500 ohms, and a common emitter resistor of 2200 ohms. Transistor 2Q8 has a 3300 ohm base resistor, and a 150 ohm emitter resistor, in series with a 1800 ohm resistor to V1, and a 0.01 capacitor to ground. The collector is coupled to pin 2 of U1 by a 0.01 UF capacitor. Pin 7 of U1 has a diode in parallel with a 0.01 UF capacitor to ground.

4. Analog and Gates

An eye pattern is present at the diode D8 cathode and its inverse is impinged on the diode D11 cathode. Resistors 2R26 and 2R27 (3300 ohms each) are pull-up resistors that attempt to pull the connections between diodes D8/D9 and D10/D11 positive. If the differentiated timing pulse present at the cathodes of diodes D9 and D10 is positive and either the eye pattern at the cathode of diode D8 or the cathode of diode D11 is also positive, then the input to transformer 8 (either pin 3 or pin 2) will move positive following the least positive excursions of the two input signals. If either pin 3 or pin 2 of transformer 8 goes positive by as much as 0.7 volt, the respective transistor 2Q9 or 2Q10 will go into conduction and initiate an output pulse from transformer 8. It is important to note that the analog AND gates used here (diodes D10, D12 and resistor 2R14 as well as diodes D11, D13 and resistor 2R25) are controlled by the least positive signal on their respective cathode inputs. This means that regardless of the positive excursion of either signal, either the differentiated timing pulse or the initiating eye pattern from transformer 2T2 will control the voltage at the anode junction of diodes D8, D9 and resistor 2R26 or the corresponding other analog AND gate. Thus, if the timing pulse is high from capacitor 2C31 and the eye pattern signal is low or negative from transformer 2T2, then the output of this gate would still be low and no triggering signal would enter transformer 8 on pin 3. A similar set of circumstances would occur at the other gate. By the same logic, it is only during the positive timing spike that it is possible for the analog AND gate to have an output. This type of circuit therefore ensures that the recovered timing is in complete control of the leading edge of the output pulse of the pulse form restorer. The leading edge may be determined by either of the two analog AND gates. Load resistor 2R28 (180 ohms), for the differentiated pulse, is returned to a negative 0.7 volt provided by the forward drop of diode D5.

5. Driver Circuit

The driver section of the pulse form restorer consists of transformer 8, transistors 2Q9 and 2Q10 and resistors 2R40, 2R41, 2R36, 2R37, and 2R39 (120, 120, 220, 1000 and 220 ohms respectively). If the signal coincident with the recovered timing spike is present on either pin 3 or pin 2 of transformer 8, that side of the driver will be initiated. A pulse on pin 3 will cause transistor 2Q9 to conduct and go to saturation. Current then flows through resistor 2R27 and the primary of transformer 8 (pin 5). The leading edge of the pulse is coupled to the output circuit as well as coupled back to the input of 2Q9 in a regenerative sense to sustain the pulse and keep 2Q9 in conduction. This produces a square-top pulse across the output secondary of transformer 8. The pulse is stopped when the negative going recovered timing spike enters the analog AND gate at the junction of cathodes of diodes D9 and D10. The negative spike is sufficient to drive the conducting transistor into cutoff. The lead edge and the trail edge are therefore very precisely controlled by the recovered timing.

The purpose of resistors 2R40 and 2R41 is to establish the pulse amplitude at the output of transformer 8 to be 1 volt peak. These resistors (2R40, 2R41 plus 2R36, 2R37, and 2R39) also act as damping resistors to prevent the transformer from overswinging either in the positive or negative direction. Transistor 2Q9 or 2Q10 will never be in conduction simultaneously, but either one could be; then, the opposite transistor is cut off permitting the resistors to act as dampers on the circuit. The output pulse is impinged on terminals, E3 and E4, to the center conductor and shield of the cable. The four diodes between terminals E3 and E4 comprise the EMP and transient protection for the 2N918 transistors 2Q9 and 2Q10.

6. Traffic Detector

The traffic detector is formed by two gates in 2U1. They are connected as a bow-tie flip-flop and toggle as the collectors of transistors 2Q9 and 2Q10 are grounded respectively. The output from the bow-tie flip-flop is coupled through capacitors 2C22 and 2C23 (0.1 UF each) into a rectifier circuit consisting of two diodes, and two capacitors of 0.01 microfarads each shown below the diodes, to provide a dc voltage for saturating electronic switch 11, a type 2N2907A transistor, which in turn shorts out resistor 10, the precision 56.2±1% resistor. Should the flip-flop fail to toggle in the event that traffic is interrupted, then there will be no signal at pins 6 and 8 of the bowtie flip-flop and hence no dc to saturate transistor 11. Resistor 10 would be inserted in series with the entire power supply string. The purpose of 2IR1 (type 1N5305) is to provide a constant current to transistor 11 and thereby prevent over saturating its base emitter junction when the pattern changes from very few ones to a great number of ones. The purpose of inductor 2L2 (220 microhenries) is to provide a low-impedance dc path for the transistor 11 saturating current but its form a high ac impedance to the negative power supply to prevent loading the flipflop output. Thus, when traffic is interrupted, transistor 11 become unsaturated inserting resistor 10 into the system. When traffic returns, transistor 11 becomes saturated and resistor 10 is shorted out. It is through this system of inserting and removing resistor 10 that the cable fault locator circuit pinpoints the number of restorers that effectively pass data and as a result can locate those that do not pass data. A 1000 ohm resistor connects V2 to unused inputs of 2U1.

7. Power Supply

Diodes VR1 and VR2, which are Zeners 1N750A and 1N753A, respectively, form the power supply regulator. They are shunted respectively by capacitors 2C5 (15 UF) and 2C6 (2.2UF). The positive voltage is approximately 4.7 volts and the negative voltage is approximately −6 volts. Back-to-back Zener diodes VR3 and VR4 are for EMP (electromagnetic protection) bypass and to protect the circuit from overvoltage if an internal open circuit were to occur. Under such conditions, the voltage drop cannot exceed 21 volts.

8. Adjustment

There are two adjustments in the restorer. The neutralization is accomplished by adjusting 2C14 (2–8 picofarads) with an oscilloscope connected to TP2 to view the recovered timing. The recovered timing should be a very, very steady sine wave. Capacitor 2C14 should be adjusted until no jitter is observable at TP2. The adjustment of capacitor 2C25 (9–35 picofarads) is not very critical. It changes the phase and amplitude of the recovered timing; capacitor 2C25 is adjusted to equalize the positive and negative excursions for digital ONE's to 100 nanoseconds ±10 nanoseconds. There are no other adjustments in the restorer.

9. Field Access To Cable Orderwire, Using AN/PTM-7

The AN/PTM-7 test set can be used for orderwire access to the Pulse Form Restorer. A special adapter cable is necessary to connect the orderwire connector on the restorer to the PTM-7 unit. The special cable connects to each restorer half so that conversion can take place among operators at the restorer and at both ends of the link simultaneously. The two shielded conductors that comprise the adapter cable have a built-in 0.047 microfarad capacitor in shunt across each shielded conductor to filter spikes from the output PTM-7 ring signal to prevent digital errors in the restorer. This capacitor also reduces the PTM-7 ring sensitivity, thereby reducing the tendency of the local ring detector to talk-down.

What is claimed is:

1. Apparatus for isolating a faulty pulse form restorer in a system having first and second terminals connected by a pair of transmission lines to normally transmit trains of pulses full duplex from sending means in each terminal to receiving means in the other terminal, with each transmission line having restorer units at intervals to regenerate the form of the pulses, power means to supply direct current from a terminal over a transmission line to provide power to the restorer units, each restorer unit having fault means which responds to the absence of a train of pulses to change by a fixed value the resistance of the direct current path through that restorer unit;

said apparatus comprises:

loop switching means operated for a test mode at the second terminal to couple the train of pulses from its receiving means to its sending means, and to make a direct current connection between the two transmission lines, so that a train of pulses from the sending means of the first terminal over one transmission line is returned over the other transmission line, direct current from the power means of the first terminal flows through the two transmission lines in series, and there is a chain of restorer units starting at the sending means of the first terminal out over the one transmission line and continuing back over the other transmission line;

test clock means to interrupt the train of pulses in the sending means of the first terminal to have repetitive predetermined on and off intervals, whereby during the off intervals all restorer units of the two transmission lines have said change by a fixed value of the resistance of the direct current path, and during the on intervals only a faulty restorer unit and subsequent restorer units in the chain have said change;

and fault locator means coupled to said power means in the first terminal to make a measurement which is a function of the difference between the resistance in the direct current path through the two transmission lines for said on and off intervals, and display means coupled to the detector means to display a number dependent on said measurement which indicates which restorer unit is faulty.

2. Apparatus as set forth in claim 1, for use with a system wherein said power means is a constant current source; wherein said fault locator means includes clamp means comprising clamp diodes coupled via a series capacitor to said power means, and a peak detector coupled to the clamp means, said measurement comprising the production of a peak detector output which is proportional to the peak-to-peak difference of the voltage at said power means.

3. Apparatus as set forth in claim 2, for use in a system wherein each pulse form restorer comprises two restorer units for the two directions of transmission, and a chart at the first terminal shows the relation of the number displayed to the location of the pulse form restorer having a faulty unit.

4. Apparatus as set forth in claim 2, wherein said first and second terminals are identical, and either may be used for the fault location and display as determined by the operative position of the loop switching means.

5. Apparatus as set forth in claim 2, wherein said fault locator means further includes a spike filter coupled between said power means and said series capacitor of the clamp means.

6. Apparatus as set forth in claim 5, wherein said spike filter comprises a pi arrangement of one shunt capacitor and a series resistor.

7. Apparatus as set forth in claim 5, including a switch connected between said series capacitor and said peak detector to provide a short circuit path when in an "off" position to thereby cause the said series capacitor of said clamp means to be initially charged to the power supply voltage.

8. Apparatus as set forth in claim 2, wherein said peak detector comprises active circuit means including operational amplifiers with feedback.

9. Apparatus as set forth in claim 2, wherein said fault locator means further includes analog-to-digital converter means connected to convert the output of said peak detector to a digital number, said display means being coupled to the output of the analog-to-digital converter means.

10. Apparatus as set forth in claim 9, wherein said analog-to-digital converter means includes up-down counting means controlled by clock signals and an operational amplifier circuit coupled to the peak detector.

11. Apparatus as set forth in claim 9, wherein said analog-to-digital converter includes an offset adjustment voltage divider to set the displayed number to "1" for the condition with no restorer units.

12. Apparatus as set forth in claim 11, further including a calibration adjustment voltage divider at the input of said peak detector for setting so that said display means displays a number designating the number of restorer units passing the train of pulses plus one.

13. Apparatus as set forth in claim 9, for use in a system wherein each restorer unit includes a precision resistor in the direct current path which is normally shunted by an electronic switch device, and said fault means in response to the absence of a train of pulses biases the electonic switch means to cut off, with a reference precision resistor also connected in series with the power means at said first terminal, all of said precision resistors having the same said fixed value;

and said apparatus further includes reference circuit means coupling the voltage across said reference precision resistor to said analog-to-digital converter.

14. Apparatus as set forth in claim 13, wherein the coupling between the reference precision resistor and the analog-to-digital converter includes an inverting unity gain amplifier.

15. Apparatus for isolating a faulty unit in a system in which a plurality of units in tandem for signals are powered from a direct flow through said units in series, with fault means in each unit which responds to the absence of said signals to change the direct current resistance by a fixed value;

said apparatus comprises:

clocking means to periodically turn said signals on and off whereby the fault means of all units cause said change of resistance when the signals are off, and only a faulty unit and subsequent units cause said change of resistance when the signals are on;

and fault locator means coupled to said direct current source to automatically make a peak-to-peak measurement which is a function of the total change of resistance through said units between the on and off intervals of said signals, to thereby indicate which unit is faulty.

16. Apparatus as set forth in claim 15, for use in a system in which said direct current source is a constant current source, wherein said fault locator means includes clamp means coupled via a series capacitor to said direct current source, and an active peak detector coupled to the clamp means.

17. Apparatus as set forth in claim 16, wherein said fault locator means includes a spike filter coupled between the direct current source and said series capacitor.

18. Apparatus as set forth in claim 16, wherein said fault locator means further includes analog-to-digital converter means connected to convert the output of said peak detector to a digital number, said display means being coupled to the output of the analog-to-digital converter means.

* * * * *